(12) United States Patent
Asveren et al.

(10) Patent No.: US 11,496,307 B2
(45) Date of Patent: Nov. 8, 2022

(54) METHODS AND APPARATUS FOR ADDING AND/OR PROVIDING STIR/SHAKEN DIVERSION INFORMATION

(71) Applicant: Ribbon Communications Operating Company, Inc., Westford, MA (US)

(72) Inventors: Tolga Asveren, Bordentown, NJ (US); Pradeep Bala, Bangalore (IN); Michael Stovenour, McKinney, TX (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 102 days.

(21) Appl. No.: 17/120,092

(22) Filed: Dec. 11, 2020

(65) Prior Publication Data
US 2022/0094548 A1    Mar. 24, 2022

(30) Foreign Application Priority Data
Sep. 21, 2020    (IN) .............................. 202041040754

(51) Int. Cl.
*H04L 9/32* (2006.01)
*H04L 69/22* (2022.01)
(Continued)

(52) U.S. Cl.
CPC ........ *H04L 9/3213* (2013.01); *H04L 65/1069* (2013.01); *H04L 65/1104* (2022.05); *H04L 69/22* (2013.01)

(58) Field of Classification Search
None
See application file for complete search history.

(56) References Cited

U.S. PATENT DOCUMENTS

2013/0089025 A1* 4/2013 Titcombe ............ H04L 65/1046
370/328
2013/0251123 A1* 9/2013 Tirunagari ............ H04M 3/533
379/88.22

(Continued)

OTHER PUBLICATIONS

Signaling Packet Aggregation and Compression in SIP Network: Modeling and Performance Evaluation. Mishra, Garima; Gautam, Anupam; Dharmaraja, S.; Kar, Subrat. Wireless Personal Communications 110.2: 651-76. Springer. (Jan. 2020) (Year: 2020).*

(Continued)

*Primary Examiner* — Jeffrey R Swearingen
(74) *Attorney, Agent, or Firm* — Straub & Straub; Stephen T. Straub; Michael P. Straub

(57) ABSTRACT

Communications methods and apparatus for providing and/or adding STIR/SHAKEN Diversion Information to requests. An exemplary method embodiment includes the steps of: receiving at a second communications network a Session Initiation Protocol (SIP) Invite request from a first communications network, the SIP Invite request being directed to a first SIP address corresponding to a first user equipment device located within the second communications network, the SIP Invite request including a SIP Identity shaken header and one or more SIP Identity div headers; determining at the second communications network whether or not the received SIP Invite request was previously diverted by the second communications network to another network; and when the SIP Invite request is determined to have been previously diverted by the second communications network to another network, processing the SIP Invite request at the second communications network as a previously received and diverted SIP Invite request.

20 Claims, 15 Drawing Sheets

(51) Int. Cl.
*H04L 65/1069* (2022.01)
*H04L 65/1104* (2022.01)

(56) References Cited

U.S. PATENT DOCUMENTS

2017/0353599 A1* 12/2017 Haltom ............... H04M 3/2281
2019/0007806 A1* 1/2019 Chu ................... H04M 3/42059
2021/0203700 A1* 7/2021 Asveren .............. H04L 65/1104
2022/0182490 A1* 6/2022 Anand .............. H04M 3/42059

OTHER PUBLICATIONS

OpenSIP: toward software-defined SIP networking Montazerolghaem, Ahmadreza; Moghaddam, Mohammad Hossein Yaghmaee; Leon-Garcia, Alberto. IEEE Transactions on Network and Service Management 15.1: 184-99. IEEE. (Mar. 2018) (Year: 2018).*

Rosenberg et al., Request for Comments (RFC) 3261 entitled "SIP: Session Initiation Protocol", Internet Engineering Task Force, Jun. 2002, 269 pages.

Handley et al., Request for Comments (RFC) 4566 entitled "SDP: Session Description Protocol", Internet Engineering Task Force, Jul. 2006, 49 pages.

Wendt et al., Request for Comments (RFC) 8588 entitled "Personal Assertion Token (PaSSporT) Extension for Signature-based Handling of Asserted information using toKENs (SHAKEN)", Internet Engineering Task Force, May 2019, 9 pages.

Barnes et al., Request for Comments (RFC) 7044 entitled "An Extension to the Session Initiation Protocol (SIP) for Request History Information", Internet Engineering Task Force, Feb. 2014, 36 pages.

Levy et al., Request for Comments (RFC) 5806 entitled "Diversion Indication in SIP", Internet Engineering Task Force, Mar. 2010, 53 pages.

* cited by examiner

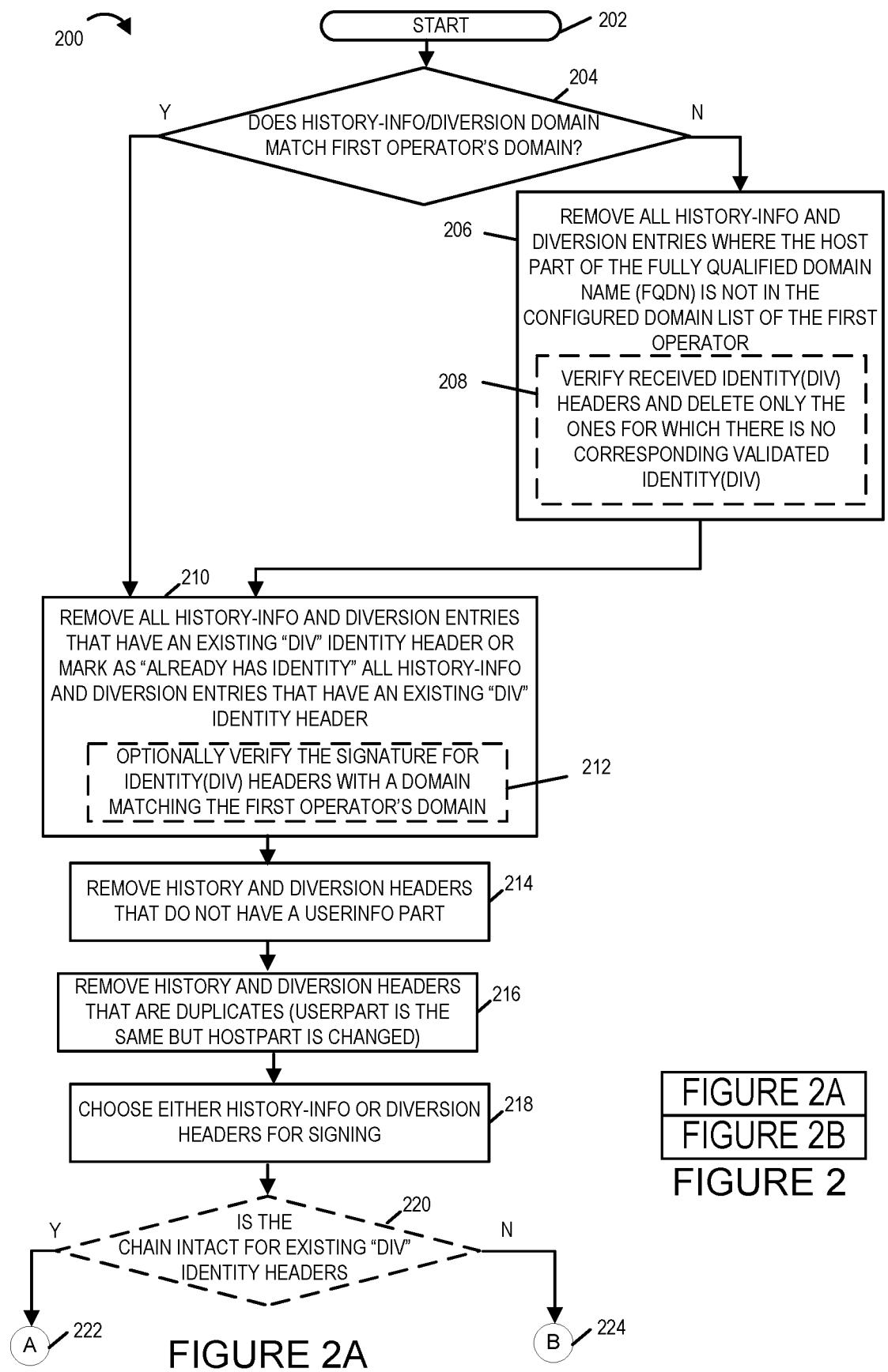

300

```
Alice    atlanta.example.com  biloxi.example.com   Bob@pc     Bob@phone
|                |                   |                |           |
|   INVITE sip:bob@biloxi.example.com;p=x            |           |
|--------------->|                   |                |           |
| Supported: histinfo                |                |           |
| History-Info: <sip:bob@biloxi.example.com;p=x>;index=1         |
|                |                   |                |           |
|                |   INVITE sip:bob@biloxi.example.com;p=x       |
|                |--------------->|                |           |
| History-Info: <sip:bob@biloxi.example.com;p=x>;index=1         |
| History-Info: <sip:bob@biloxi.example.com;p=x>;np=1;index=1.1  |
|                |                   |                |           |
|                |                   |   INVITE sip:bob@192.0.2.3|
|                |                   |--------------->|           |
| History-Info: <sip:bob@biloxi.example.com;p=x>;index=1         |
| History-Info: <sip:bob@biloxi.example.com;p=x>;np=1;index=1.1  |
| History-Info: <sip:bob@192.0.2.3>;index=1.1.1;rc=1.1           |
|                |                   |                |           |
|                |                   |   INVITE sip:bob@192.0.2.7|
|                |                   |-------------------------->|
| History-Info: <sip:bob@biloxi.example.com;p=x>;index=1         |
| History-Info: <sip:bob@biloxi.example.com;p=x>;np=1;index=1.1  |
| History-Info: <sip:bob@192.0.2.7>;index=1.1.2;rc=1.1           |
```

FIGURE 3

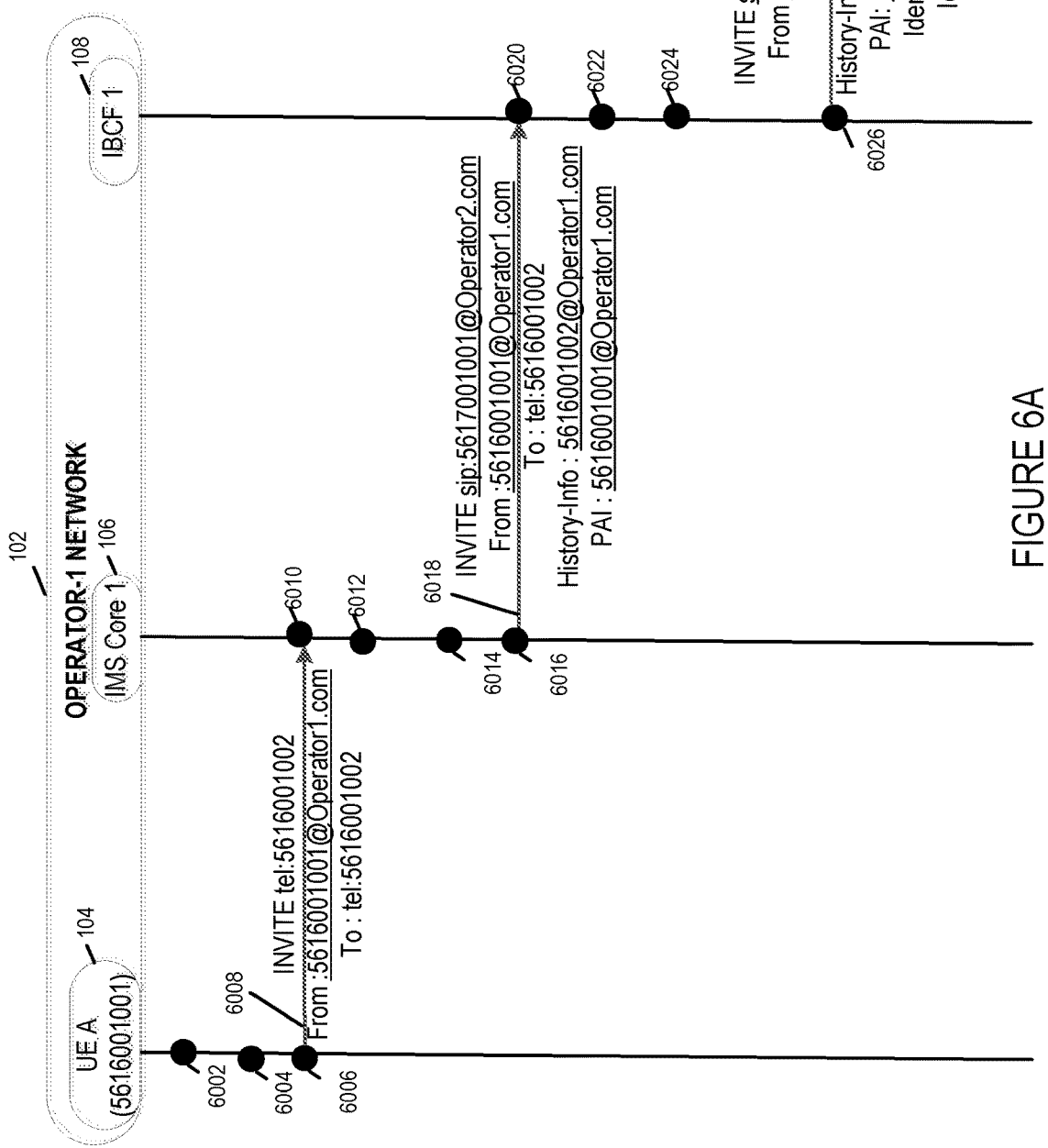

PROCESS SAID SIP INVITE REQUEST AT THE SECOND COMMUNICATIONS NETWORK AS A PREVIOUSLY RECEIVED AND DIVERTED SIP INVITE REQUEST CONTINUED FROM FIGURE 7B — 720

744 — DETERMINING, BY THE FIRST NETWORK DEVICE, THAT THE FIRST UPDATED SIP INVITE REQUEST DIRECTED TO THE FIRST SIP ADDRESS IS TO BE DIVERTED OR FORWARDED TO A SECOND SIP ADDRESS CORRESPONDING TO A SECOND USER EQUIPMENT DEVICE, SAID SECOND SIP ADDRESS INCLUDING A DOMAIN NAME OF A COMMUNICATIONS NETWORK DIFFERENT THAN SAID SECOND COMMUNICATIONS NETWORK, E.G., A THIRD COMMUNICATIONS NETWORK

746 — WHEN THE FIRST NETWORK DEVICE DETERMINES THAT THE FIRST UPDATED SIP INVITE REQUEST IS TO BE DIVERTED OR FORWARDED TO THE SECOND SIP ADDRESS INCLUDING A DOMAIN NAME OF A COMMUNICATIONS NETWORK DIFFERENT THAN SAID SECOND COMMUNICATIONS NETWORK, E.G., THE THIRD COMMUNICATIONS NETWORK, THE FIRST NETWORK DEVICE PERFORMS THE FOLLOWING OPERATIONS:

748 — GENERATING, BY THE FIRST NETWORK DEVICE, A SIP HISTORY-INFO HEADER INCLUDING THE FIRST SIP ADDRESS, THE FIRST SIP ADDRESS INCLUDING THE DOMAIN NAME FOR THE SECOND COMMUNICATIONS NETWORK

750 — GENERATING, BY THE FIRST NETWORK DEVICE, A SECOND UPDATED SIP INVITE REQUEST BY UPDATING THE FIRST UPDATED SIP INVITE REQUEST, SAID UPDATING THE FIRST UPDATED SIP INVITE REQUEST INCLUDING: (i) UPDATING THE REQUEST LINE OF THE FIRST UPDATED SIP INVITE REQUEST TO INCLUDE THE SECOND SIP ADDRESS, (ii) ADDING SAID GENERATED SIP HISTORY-INFO HEADER INCLUDING THE FIRST SIP ADDRESS

754 — DETERMINING, BY THE FIRST NETWORK DEVICE, THAT THE FIRST UPDATED SIP INVITE REQUEST DIRECTED TO THE FIRST SIP ADDRESS IS TO BE DIVERTED OR FORWARDED TO A SECOND SIP ADDRESS CORRESPONDING TO A SECOND USER EQUIPMENT DEVICE, SAID SECOND SIP ADDRESS INCLUDING A DOMAIN NAME MATCHING THE DOMAIN NAME OF THE SECOND COMMUNICATIONS NETWORK, SIP INVITE REQUESTS TO SAID SECOND SIP ADDRESS BEING DIVERTED OR FORWARDED TO A THIRD SIP ADDRESS CORRESPONDING TO A THIRD USER EQUIPMENT DEVICE, SAID THIRD SIP ADDRESS INCLUDING A DOMAIN NAME OF A COMMUNICATIONS NETWORK DIFFERENT THAN SAID SECOND COMMUNICATIONS NETWORK, E.G., A FOURTH COMMUNICATIONS NETWORK

756 — WHEN THE FIRST NETWORK DEVICE DETERMINES THAT THE FIRST UPDATED SIP INVITE REQUEST IS TO BE DIVERTED OR FORWARDED TO THE THIRD SIP ADDRESS INCLUDING A DOMAIN NAME OF A COMMUNICATIONS NETWORK DIFFERENT THAN THE SECOND COMMUNICATIONS NETWORK, E.G., THE FOURTH COMMUNICATIONS NETWORK, THE FIRST NETWORK DEVICE PERFORMS THE FOLLOWING OPERATIONS:

758 — GENERATING, BY THE FIRST NETWORK DEVICE, A SIP HISTORY-INFO HEADER INCLUDING THE FIRST SIP ADDRESS, THE FIRST SIP ADDRESS INCLUDING THE DOMAIN NAME FOR THE SECOND COMMUNICATIONS NETWORK

760 — GENERATING, BY THE FIRST NETWORK DEVICE, A SIP HISTORY-INFO HEADER INCLUDING THE SECOND SIP ADDRESS, THE SECOND SIP ADDRESS INCLUDING THE DOMAIN NAME FOR THE SECOND COMMUNICATIONS NETWORK

762 — GENERATING, BY THE FIRST NETWORK DEVICE, A SECOND UPDATED SIP INVITE REQUEST BY UPDATING THE FIRST UPDATED SIP INVITE REQUEST, SAID UPDATING THE FIRST UPDATED SIP INVITE REQUEST INCLUDING: (i) UPDATING THE SIP INVITE REQUEST LINE OF THE FIRST UPDATED SIP INVITE REQUEST TO INCLUDE THE THIRD SIP ADDRESS, (ii) ADDING SAID GENERATED SIP HISTORY-INFO HEADER INCLUDING THE FIRST SIP ADDRESS, (iii) ADDING SAID GENERATED SIP HISTORY-INFO HEADER INCLUDING THE SECOND SIP ADDRESS

```
764
PROCESS SAID SIP INVITE REQUEST AT THE SECOND COMMUNICATIONS NETWORK AS
A PREVIOUSLY RECEIVED AND DIVERTED SIP INVITE REQUEST
CONTINUED FROM FIGURE 7C
                                                                                766
TRANSMITTING FROM THE FIRST NETWORK DEVICE TO A SECOND EDGE DEVICE OF THE
SECOND COMMUNICATIONS NETWORK SAID SECOND UPDATED SIP INVITE REQUEST

RECEIVING FROM THE FIRST NETWORK DEVICE AT THE SECOND EDGE DEVICE OF THE  768
SECOND COMMUNICATIONS NETWORK THE SECOND UPDATED SIP INVITE REQUEST
                                                                                770
GENERATING, AT THE SECOND EDGE DEVICE, A THIRD UPDATED SIP INVITE REQUEST
BASED ON THE SECOND UPDATED SIP INVITE REQUEST                           772

GENERATING, AT THE SECOND EDGE DEVICE, THE THIRD UPDATED SIP INVITE REQUEST
  INCLUDING: (i) IDENTIFYING ALL SIP HISTORY-INFO HEADERS INCLUDING THE DOMAIN NAME OF
  THE SECOND COMMUNICATIONS NETWORK; (ii) IDENTIFYING WHICH OF THE IDENTIFIED SIP
  HISTORY-INFO HEADERS INCLUDING THE DOMAIN NAME OF THE SECOND COMMUNICATIONS
  NETWORK HAVE BEEN MARKED; (iii) REFRAINING FROM GENERATING SIP IDENTITY DIVERSION
  HEADERS FOR THE IDENTIFIED MARKED HISTORY-INFO HEADERS AND (iii) GENERATING AT LEAST
  ONE SIP IDENTITY DIVERSION HEADER FOR A HISTORY-INFO HEADER THAT INCLUDES THE
  DOMAIN NAME OF THE SECOND COMMUNICATIONS NETWORK AND THAT MEETS ONE OR MORE
  CONDITIONS                                                                774
    GENERATING AT LEAST ONE SIP IDENTITY DIVERSION HEADER FOR A HISTORY-INFO
    HEADER THAT INCLUDES THE DOMAIN NAME OF THE SECOND COMMUNICATIONS
    NETWORK AND MEETS THE ONE OR MORE CONDITIONS INCLUDES GENERATING SIP
    IDENTITY DIVERSION HEADER(S) FOR EACH HISTORY-INFO HEADER THAT INCLUDES THE
    DOMAIN NAME OF THE SECOND COMMUNICATIONS NETWORK AND MEETS THE ONE OR
    MORE CONDITIONS, SAID ONE OR MORE CONDITIONS INCLUDING AT LEAST THAT THE
    HISTORY-INFO HEADER IS NOT MARKED                                     776
    GENERATING AT LEAST ONE SIP IDENTITY DIVERSION HEADER FOR A HISTORY-INFO
    HEADER THAT INCLUDES THE DOMAIN NAME OF THE SECOND COMMUNICATIONS NETWORK
    AND MEETS THE ONE OR MORE CONDITIONS INCLUDES INCLUDES GENERATING A SINGLE
    SIP IDENTITY DIVERSION HEADER FOR THE SIP HISTORY-INFO HEADER INCLUDING THE
    FIRST SIP ADDRESS WHEN THE SECOND SIP ADDRESS INCLUDES THE DOMAIN NAME OF A
    COMMUNICATIONS NETWORK DIFFERENT THAN THE SECOND COMMUNICATIONS NETWORK WHEN SAID FIRST SIP ADDRESS AND SAID SECOND SIP ADDRESS BOTH INCLUDE A DOMAIN
  NAME MATCHING THE SECOND COMMUNICATIONS NETWORK DOMAIN NAME, GENERATING AT
  LEAST ONE SIP IDENTITY DIVERSION HEADER FOR A HISTORY-INFO HEADER THAT INCLUDES
  THE DOMAIN NAME OF THE SECOND COMMUNICATIONS NETWORK AND MEETS THE ONE OR
  MORE CONDITIONS INCLUDES GENERATING A SINGLE SIP IDENTITY DIVERSION HEADER FOR
  THE SIP HISTORY-INFO HEADER INCLUDING THE FIRST SIP ADDRESS AND THE SIP HISTORY-
  INFO HEADER INCLUDING THE SECOND SIP ADDRESS OR GENERATING SEPARATE SIP IDENTITY
  DIVERSION HEADERS FOR THE SIP HISTORY-INFO HEADER INCLUDING THE FIRST SIP ADDRESS
  AND THE SIP HISTORY-INFO HEADER INCLUDING THE SECOND SIP ADDRESS REMOVE MARKINGS FROM SIP HISTORY-INFO AND DIVERSION HEADERS MADE BY THE FIRST
EDGE DEVICE                                                                   778
                                                                              780
TRANSMITTING FROM THE SECOND EDGE DEVICE OF THE SECOND COMMUNICATIONS NETWORK
SAID THIRD UPDATED SIP INVITE REQUEST TO THE THIRD COMMUNICATIONS NETWORK    782
```

784
CONTINUE METHOD OF RECEIVING AND
PROCESSING SIP INVITE REQUESTS AT THE
SECOND COMMUNICATIONS NETWORK

| FIGURE 7A |
|-----------|
| FIGURE 7B |
| FIGURE 7C |
| FIGURE 7D |

FIGURE 7

METHODS AND APPARATUS FOR ADDING AND/OR PROVIDING STIR/SHAKEN DIVERSION INFORMATION

RELATED APPLICATIONS

The present application claims the benefit of Indian Provisional Patent Application Serial Number: 202041040754 which was filed on Sep. 21, 2020 and which is hereby expressly incorporated by reference in its entirety.

FIELD OF INVENTION

The present invention relates to systems, apparatus and methods for efficiently providing STIR/SHAKEN diversion information for diverted Session Initiation Protocol (SIP) messages and/or calls.

BACKGROUND OF THE INVENTION

Providing secure/high fidelity calling party information is important for various services, e.g., voice calls. This information may be, and sometimes is, used by end user devices and/or end users to accept/reject calls, by core network elements/devices to classify a session or call as a robocall or for further analysis to determine robocall determination criteria. STIR (which stands for Secure Telephone Identity Revisited) and SHAKEN (which stands for Secure Handling of Asserted information using toKENs) are telecommunications industry standards designed to enable service providers to cryptographically sign calls in the Session Initiation Protocol (SIP) header. STIR/SHAKEN provides a way for the calling party information to be securely transferred through several hops (network equipment devices, e.g., routers). This is achieved by using a SIP Identity header with a shaken claim set. The claim set includes calling/called party information and is accompanied by a signature generated by the service operator which has authenticated the calling party. An Identity (shaken) header is valid for a calling party/called party pair and any change in the respective SIP header fields, e.g., From, To, Request-URI header fields would cause the signature verification to fail.

A diversion is a change in the ultimate endpoint destination of a request. Call diversion is a common scenario in communication networks where the called party forwards the call to another party. This results in information in the SIP INVITE Request-URI header field to be changed but the information in the To/From header fields stay intact, that is the To and From headers are not changed. There is a need to provide fidelity for this operation as well and that is provided with Identity (div). A div claim includes information about this diversion process by including original calling/called party information as well as the new target. Verification is performed on an Identity (shaken) and one or more Identity (div) headers to make sure that the claims add up to a complete chain from original calling/called party to the final target. There could be multiple Identity (div) headers if the call is diverted several times.

In its most generic form, call diversion may involve multiple operators/administrative domains. For example, a call (or call initiation request) can be diverted several times by different operators before reaching the call's (or call initiation request's) final target or destination. STIR/SHAKEN as explained above is an initiative to provide high level fidelity for calling party information. This requires operators involved in calling party authentication and diversion to generate cryptographic signatures. These signatures together with the information they protect are carried in Identity(shaken) and Identity(div) headers respectively for authentication and diversion.

When a call is diverted several times across operator boundaries, the call is expected to include several Identity (div) headers. Furthermore, the Session Initiation Protocol (SIP) INVITE request would include several diversion related headers, e.g., History-Info headers and/or Diversion headers, added by multiple operators. An operator receiving such a SIP INVITE request needs to deduce or determine which information needs to be used for an Identity(div) the operator is going to generate.

Operators usually prefer signing (adding an Identity header) at the egress point to other operators. This is due to the fact that signing is a computing intensive operation and an operator's own network is considered "secure". Therefore, operators prefer to sign only when needed.

From the foregoing it should be appreciated that there is a need for a technological solution to the technological problem of how to efficiently determine what information included in diversion related headers of received session initiation requests to use for generating an Identity(div). There is a further need for new and/or improved methods and apparatus for eliminating or reducing the possibility of generating Identity(div) headers with information which may be misleading and/or wrong. Furthermore, there is a need for operators to reduce or minimize the number of times they sign calls which are diverted multiple times across operator boundaries.

SUMMARY OF THE INVENTION

The present invention provides a technological solution of how to provide and/or STIR/SHAKEN diversion information for diverted Session Initiation Protocol (SIP) messages and/or calls. Various embodiments of the present invention include novel methods and apparatus to solve one or more of the problems identified above.

Various embodiments of the present invention provide for a robust/not error prone mechanism to add Identity (div) headers to SIP messages, e.g., SIP Invite requests. Various embodiments described provide optimizations for signing capabilities for diverting carriers, e.g., operator networks, including for example: (i) making it possible to move signing requirements from every diverting platform and/or device on to a single platform and/or device; (ii) reducing implementation time and the number of platforms and/or devices that must be upgraded; and (iii) removing ambiguity between History-info vs. Diversion headers. With respect to spoofing, various embodiments provide spoofing prevention so that the current operator network which is processing a call or SIP INVITE request is not tricked into signing for a diversion in someone else's network. Various embodiments optimize the number of Identity headers by unambiguously identifying which headers truly represent a diversion in the diverting operator's network and by preventing the generation of multiple Identity (div) headers for the same diversion in an operator's network for scenarios involving multiple diversions/multiple operators. Various embodiments also aid operators' who prefer signing (adding Identity headers) at the egress point of an operator's network to another network even for calls and/or SIP INVITE requests which are diverted multiple times across an operator's boundaries. This provides for improved efficiency as signing/generating Identity headers is a computing intensive operation and an operator's own network is considered "secure" therefore operators prefer to sign only when needed and to sign at the egress point of the operator's network.

An exemplary communications method in accordance with an embodiment of the present invention comprises the steps of: receiving at a second communications network a Session Initiation Protocol (SIP) Invite request from a first communications network, said SIP Invite request being directed to a first SIP address corresponding to a first user equipment device located within the second communications network, said SIP Invite request including a SIP Identity shaken header and one or more SIP Identity div headers, said SIP Identity shaken header and said one or more SIP Identity div headers having been signed (i.e., encrypted in accordance with the STIR/SHAKEN suite of protocols); determining at the second communications network whether or not the received SIP Invite request was previously diverted by said second communications network to another network; and when said SIP Invite request is determined to have been previously diverted by said second communications network to another network, processing said SIP Invite request at the second communications network as a previously received and diverted SIP Invite request.

In some embodiments, the communications method further comprises that when said SIP Invite request is determined to not have been previously diverted by said second communications network to another network, processing the SIP Invite request at the second communications network as a new SIP Invite request.

In various embodiments of the invention, the step of processing said SIP Invite request by the second communications network as a previously received and diverted SIP Invite request includes refraining from generating one or more duplicate Identity div headers for one or more previous diversions by said second communications network which occurred prior to said SIP Invite request being received from said first communications network.

In some embodiments, the step of processing said SIP Invite request by the second communications network as a previously received and diverted SIP Invite request includes: marking or deleting all History-Info headers included in the received SIP Invite request which include a domain name matching the domain name of the second communications network; determining, at an IMS core of the second communications network, that the SIP Invite request is to be diverted from a destination address in the second communications network to a diversion address located in third communications network, said destination address being the first SIP address; generating, at the IMS core of the second communications network, a History-Info header including the destination address; generating, at an Interconnect Border Control Function device, a second SIP Invite request, said second SIP Invite request including an Identity diversion header based information contained in the History-Info header including the destination address; and transmitting from the Interconnect Border Control Function device the second SIP Invite request to the third communications network. In some of such embodiments, the step of generating, at the Interconnect Border Control Function device the second SIP Invite request further includes: identifying each History-Info header including a domain name that matches the domain name of the second communications network; and generating an Identity diversion header for each identified History-Info header which has not been marked.

In various embodiments, the step of determining at the second communications network whether or not the received SIP Invite request was previously diverted by said second communications network to another network includes: determining whether there is present in the SIP Invite request at least one SIP History-Info header including a domain name matching a domain name of the second communications network or at least one SIP Diversion header including a domain name matching the domain name of the second communication network. In some embodiments, the communications method further comprises that when said determination is that at least one SIP History-Info header including a domain name matching the domain name of the second communications network or at least one SIP Diversion header with a domain name that matches the domain name of the second communications network is present in said SIP Invite request, making a determination that the SIP Invite request was previously diverted by said second communications network to another network and that when said determination is that there is not at least one SIP History-Info header including a domain name matching the domain name of the second communications network and that there is not at least one SIP Diversion header with a domain name that matches the domain name of the second communications network present in said SIP Invite request, making a determination that the SIP Invite request has not been previously diverted by said second communications network to another network.

In various embodiments, the step of processing said SIP Invite request by the second communications network as a previously received and diverted SIP Invite request includes: identifying, by a first edge device of the second communications network, which of the one or more SIP Identity div headers included in the SIP Invite request includes a destination address with a domain name matching the domain name of the second communications network; and verifying, by the first edge device, the signature for each of the SIP Identity div headers included in the SIP Invite request identified as including a destination address with a domain name matching the domain name of the second communications network. In some of these embodiments, the first edge device performed said receiving at the second communications network the Session Initiation Protocol (SIP) Invite request from the first communications network.

In various embodiments, each SIP Identity div header included in the SIP INVITE request includes an origin address, a destination address, and a diversion address, said origin address being an address from which the SIP Invite request originated, said destination address being an address to which the SIP Invite request was targeted, said diversion address being an address to which the SIP Invite request was diverted.

In some embodiment, the step of processing said SIP Invite request by the second communications network as a previously received and diverted SIP Invite request further includes: generating a first updated SIP Invite request by the first edge device, said generating a first updated SIP Invite request including updating said SIP Invite request to mark or delete all SIP History-Info headers and SIP Diversion headers identified as corresponding to a successfully verified SIP Identity div header having a destination address with a domain name matching the domain name of the second network.

In some embodiments, the step of processing said SIP Invite request by the second communications network as a previously received and diverted SIP Invite request further includes: prior to generating a first updated SIP Invite request identifying by the first edge device all SIP History-Info headers and SIP Diversion headers corresponding to the SIP Identity div headers which are present in the SIP Invite request and have been successfully verified which have a destination address with a domain name of the second network.

In some embodiments the communications method further comprises the steps of: determining, by a first network device within the second communications network, that the first updated SIP Invite request directed to said first SIP address is to be diverted or forwarded to a second SIP address corresponding to a second user equipment device; generating, by the first network device, a SIP History-Info header including the first SIP address, said first SIP address including the domain name for said second communications network; generating, by the first network device, a second updated SIP request by updating the first updated SIP Invite request, said updating the first updated SIP Invite request including: (i) updating the SIP Invite request line to include the second SIP address, and (ii) adding said generated SIP History-Info header including the first SIP address. In most, but not all embodiments, the first network device is located in the IMS core of the second communications network.

In some embodiments, the step of processing said SIP Invite request by the second communications network as a previously received and diverted SIP Invite request includes: identifying, by a first edge device of the second communications network, which of the one or more SIP Invite request History-Info headers and Diversions headers include a domain name matching the domain name of the second communications network; marking or deleting each of the SIP Invite request History-Info headers and Diversion headers including a domain name matching the domain name of the second communications network. The first edge device in most, but not all embodiments, is a network device that performed the step of receiving at the second communications network the Session Initiation Protocol (SIP) Invite request from the first communications network.

In some method embodiments of the invention, the method further comprises the steps of: determining, by a first network device within the second communications network, that the first updated SIP Invite request directed to said first SIP address is to be diverted or forwarded to a second SIP address corresponding to a second user equipment device; generating, by the first network device, a SIP History-Info header including the first SIP address, said first SIP address including the domain name for said second communications network; generating, by the first network device, a second updated SIP request by updating the first updated SIP Invite request, said updating the first updated SIP Invite request including: (i) updating the SIP Invite request line to include the second SIP address, and (ii) adding said generated SIP History-Info header including the first SIP address.

In some embodiments of the invention, the method further comprises: determining, by a first network device within the second communications network, that the first updated SIP Invite request directed to said first SIP address is to be diverted or forwarded to a second SIP address corresponding to a second user equipment device, said second SIP address including a domain name matching the domain name of the second communications network; determining, by the first network device within the second communications network, that SIP Invite requests directed to the second SIP address are being diverted to a third SIP address, said third SIP address including a domain name of a third communications network; generating, by the first network device, a SIP History-Info header including the first SIP address, said first SIP address including the domain name for said second communications network; generating, by the first network device, a SIP History-Info header including the second SIP address, said first SIP address including the domain name for said second communications network; generating, by the first network device, a second updated SIP request by updating the first updated SIP Invite request, said updating the first updated SIP Invite request including: (i) updating the SIP Invite request line to include the third SIP address, (ii) adding said generated SIP History-Info header including the first SIP address, and (iii) adding said generated SIP History-Info header including the second SIP address. In some these embodiments, the method further comprises: generating, at a second edge device of the second communications network, a third updated SIP Invite request based on said second updated SIP Invite request, said generating said third updated SIP Invite request including: (i) refraining from generating SIP Identity diversion headers for marked History-Info headers and (ii) generating at least one SIP Identity diversion header for History-Info headers that include the domain name of the second communications network and are not marked; transmitting from the second edge device the third updated SIP Invite request to the third communication network.

In some embodiments the step of generating at least one SIP Identity diversion header for History-Info headers that include the domain name of the second communications network and are not marked includes generating a single Identity diversion header for the SIP History-Info header including the first SIP address and the SIP History-Info header including the second SIP address.

In some embodiments, the single Identity diversion header for the SIP History-Info header including the first SIP address and the SIP History-Info header including the second SIP address includes: a origin address, a destination address and diversion address, the destination address including the address of the first SIP address and the diversion address including the third SIP address.

In some embodiments, the step of generating at least one SIP Identity diversion header for History-Info headers that include the domain name of the second communications network and are not marked includes: generating an Identity diversion header for the SIP History-Info header including the first SIP address and a separate Identity diversion header for the SIP History-Info header including the second SIP address.

In some embodiments, the Identity diversion header for the SIP History-Info header including the first SIP address includes: an origin address, a destination address, and a diversion address, the destination address including the first SIP address, and the diversion address including the second SIP address. In some embodiments, the separate Identity diversion header for the SIP History-Info header including the second SIP address includes: an origin address, a destination address, and a diversion address, the destination address including the second SIP address, and the diversion address including the third SIP address.

In some embodiments, the second edge device of the second communications network is located at a boundary between the second communications network and the third communications network. In some embodiments, prior to generating at least one SIP Identity diversion header for History-Info headers that include the domain name of the second communications network and are not marked, identifying and excluding duplicative History-Info headers for which a SIP Identity diversion header has already been generated (e.g., History-Info headers with the same userpart but different hostpart are duplicative) and History-Info headers that do not have an address with a valid user information part from the History-Info headers for which SIP Identity diversion headers are to be generated.

The present invention is also applicable to systems, devices and apparatus, for example, systems, devices, and apparatus which implement one or more steps of the invention described herein. The system(s), device(s), and apparatus may, and in some embodiments do, include one or more processors and a memory or storage device, the memory or storage device including instructions, e.g., software instructions, which when executed by the one or more processors control the system(s), device(s) or apparatus to perform one or more steps or operations of the methods described herein.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 2 comprises FIGS. 2A and 2B.

FIG. 2A illustrates a first part of an exemplary method in accordance with an embodiment of the present invention.

FIG. 3 illustrates a portion of an exemplary signaling diagram showing populated History-Info header fields.

FIG. 6 comprises the FIGS. 6A, 6B, 6C, 6D, and 6E.

FIG. 6A illustrates a first part of exemplary signaling flow diagram with accompanying methods steps of an exemplary method in accordance with an embodiment of the present invention.

FIG. 7 comprises FIGS. 7A, 7B, 7C and 7D.

FIG. 7C illustrates a third part of an exemplary method in accordance with an embodiment of the present invention.

FIG. 7D illustrates a fourth part of an exemplary method in accordance with an embodiment of the present invention.

DETAILED DESCRIPTION

Figure 1:
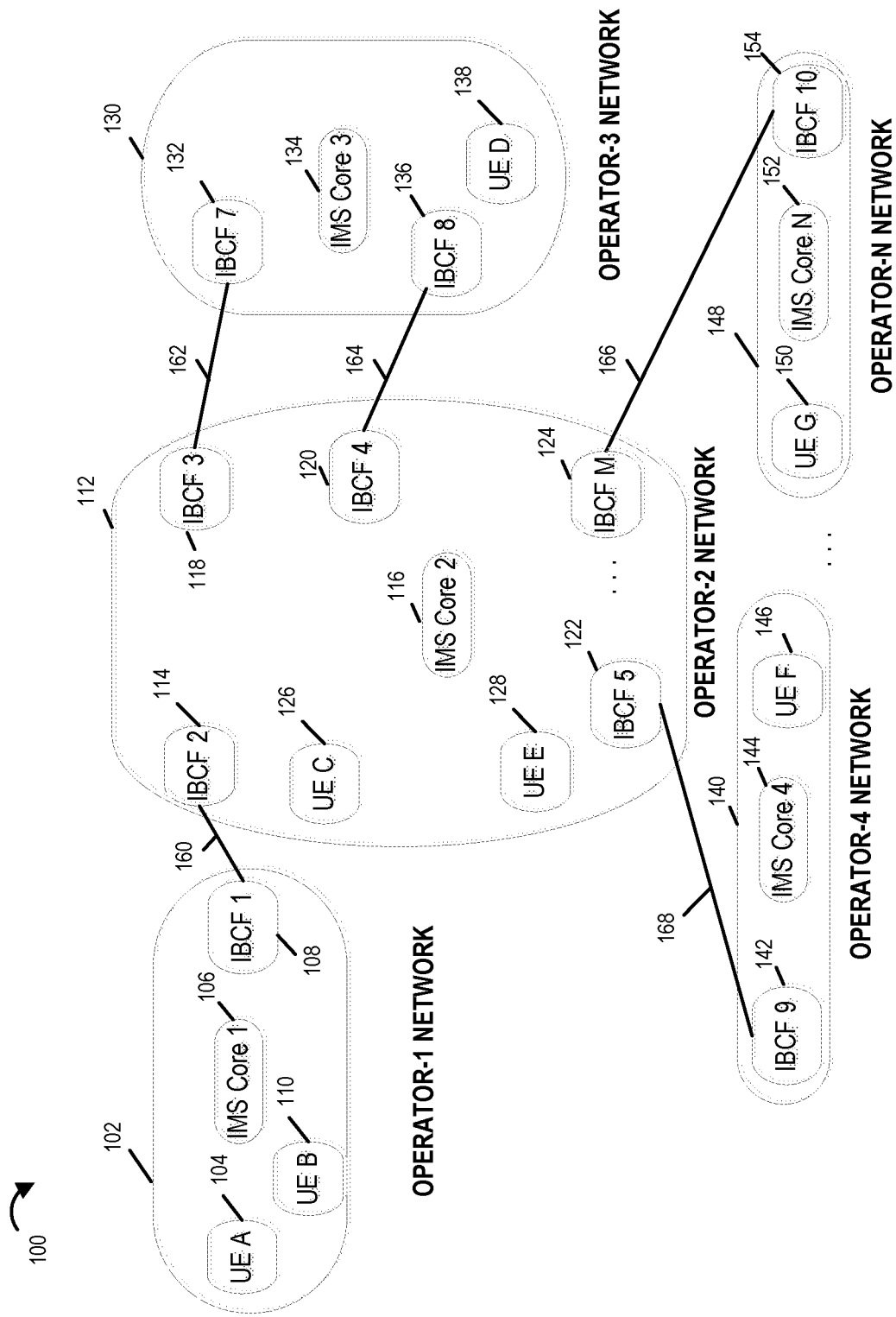
FIG. 1 illustrates an exemplary communications system in accordance with an embodiment of the present invention.

The present invention relates to, among other things, systems, apparatus and methods to efficiently determine what information included in diversion related headers of received session initiation requests to use for generating an Identity(div) header.

Various embodiments of the present invention address and solve one or more of the technological problems discussed above.

Session Initiation Protocol (SIP) is to establish calls in various networks including Operator networks.

Various Request For Comments specifications describe the details of the SIP protocol. Request for Comments (RFC) 3621 entitled "SIP: Session Initiation Protocol" published in July 2002 by the IETF (Internet Engineering Task Force) is a specification that provides information that describes the Session Initiation Protocol. RFC 4566 entitled "SDP: Session Description Protocol" published in July 2006 by the IETF is a specification that provides information that describes the Session Description Protocol." RFC 8588 entitled, "Personal Assertion Token (PaSSporT) Extension for Signature-based Handling of Asserted information using toKENs (SHAKEN)" published in May 2019 by the IETF is a specification that describes the extension of "the Personal Assertion Token (PASSporT), which is a token object that conveys cryptographically signed information about the participants involved in communications. The extension is defined based on the "Signature-based Handling of Asserted information using toKENs (SHAKEN)" specification by the ATIS/SIP Forum IP-NNI Task Group. It provides both (1) a specific set of levels of confidence in the correctness of the originating identity of a call originated in a SIP-based telephone network as well as (2) an identifier that allows the Service Provider (SP) to uniquely identify the origin of the call within its network. Request for Comments (RFC) 7044 entitled "An Extension to the Session Initiation Protocol (SIP) for Request History Information" published in February 2014 by the IETF (Internet Engineering Task Force) is a specification that provides information that describes the SIP history-information header. Request for Comments (RFC) 5806 entitled "Diversion Indication in SIP" published in March 2010 by the IETF (Internet Engineering Task Force) is a draft specification that provides information that describes the SIP diversion header. Each of the aforementioned specification is hereby incorporated by reference in their entirety.

In the SIP protocol, SIP INVITE requests are used to initiate calls. The format of a SIP INVITE request message will now be discussed as various components of the SIP INVITE request message are utilized and referred to in connection with the present invention. A SIP INVITE request message includes consists of four sections: (i) the request line, (ii) the headers, (iii) a blank line, and (iv) an optional message body. The "Request-line" consists of three components: the method name, Request-Uniform Resource Identifier (R-URI), and the protocol version.

For example, if Anne initiates a call to Bob, the Request-line of Anne's INVITE may be expressed as: INVITE sip:Bob@operator 2.com SIP/2.0

The first component in the line specifies the Method used in this Request. In this example, it is an INVITE, stating that Anne wishes to initiate a session with Bob. The second component is the R-URI and it identifies the recipient of this SIP INVITE request which is Bob. SIP Uniform Resource Identifier (SIP URI) which basically contains the contact information or address of a SIP user and it is formatted as:

sip: <userinfo>@<host>

The user information part or userpart may be, and typically is, a user name or telephone number. The host is a domain name of a network host, or its IPv4 address as a set of four decimal digit groups separated by ".."

In this example, the username is "Bob" and the host is the domain "operator 2.com" which is the domain of the operator's network of which Bob is a subscriber. The third section of the SIP INVITE request specifies the protocol (SIP) and that version (2.0) is being used.

Of particular interest in connection with the present invention are the SIP History-Info header field and SIP Diversion header field of a SIP INVITE request.

The SIP History-Info header field, as explained in the Request for Comments (RFC) 7044 dated February 2014, captures the Request-URIs, as a request is retargeted such as for example when a request is forwarded or diverted. The History-Info header field is added to a request when a new request is created by a User Agent Client (UAC) or forwarded by a proxy, or when the target of a request is changed so that the Request-URI information is not lost. The SIP History-Info header field parameters "rc", "mp" and "np" provide a way to tag the method by which the target of a request is determined.

Section 5 of the RFC 7044 further describes the details "for the information that is captured in the History-Info field entries for each target used for forwarding a request as: (i) hi-targeted-to-uri: A mandatory parameter for capturing the Request-URI for the specific request as it is forwarded; (ii) hi-index: A mandatory parameter for History-Info reflecting the chronological order of the information, indexed to reflect the forking and retargeting of requests. The format for this parameter is a sequence of nonnegative integers, separated by dots to indicate the number of forward hops and retargets. This results in a tree representation of the history of the request, with the lowest-level index reflecting a leaf. By adding the new entries in chronological order (i.e., following existing entries per the details in Section 10.3), including the index and sending the messages using a secure transport, the ordering of the History-Info header fields in the request is assured; (iii) hi-target-param: An optional parameter reflecting the mechanism by which the Request-URI captured in the hi-targeted-to-uri in the History-Info header field value (hi-entry) was determined. This parameter is either an "rc", "mp", or "np" header field parameter, which is interpreted as follows: "rc": The hi-targeted-to-URI represents a change in Request-URI, while the target user remains the same. This occurs, for example, when the user has multiple AORs as an alias. The "rc" header field parameter contains the value of the hi-index in the hi-entry with an hi-targeted-to-uri that reflects the Request-URI that was retargeted. "mp": The hi-targeted-to-URI represents a user other than the target user associated with the Request-URI in the incoming request that was retargeted. This occurs when a request is statically or dynamically retargeted to another user represented by an AOR unassociated with the AOR of the original target user. The "mp" header field parameter contains the value of the hi-index in the hi-entry with an hi-targeted-to-uri that reflects the Request-URI that was retargeted, thus identifying the "mapped from" target. "np": The hi-targeted-to-URI represents that there was no change in the Request-URI. This would apply, for example, when a proxy merely forwards a request to a next-hop proxy and loose routing is used. The "np" header field parameter contains the value of the hi-index in the hi-entry with an hi-targeted-to-uri that reflects the Request-URI that was copied unchanged into the request represented by this hi-entry. That value will usually be the hi-index of the parent hi-entry of this hi-entry." (RFC 7044, February 2014, pages 7-8).

The following is an exemplary populated History-Info header:History-Info:    <sip:UserA@ims.example.com>; index=1; rc=1.2 In this example, the "hi-targeted-to-uri" field is "UserA@ims.example.com", the hi-index is 1, and the rc parameter is 1.2. The userpart is the username "UserA". The host comprises the hostname "ims" and the domain "example.com".

Diagram 300 shown in FIG. 3 illustrates a portion of an exemplary call flow from the RFC 7044 standard which provides further examples of how the History-Info header fields are populated for a call as the call is retargeted/diverted.

An exemplary Diversion header may be expressed as "Diversion: UserA@Operator1.com. reason=unconditional" where UserA@Operator1.com is the address of the SIP destination target that is diverting the SIP INVITE request for example because it has an unconditional call forwarding feature enabled. The Request for Comments (RFC) 5806 entitled "Diversion Indication in SIP" published in March 2010 by the IETF (Internet Engineering Task Force) which was previously discussed is a draft specification that provides information that describes the SIP diversion header in detail.

As discussed above with respect to the Shaken/Stir protocols the originating operator or service provider authenticates or verifies the calling/called party. The originating operator or service provider equipment checks information in the received SIP INVITE request and verifies no spoofing is going on. However, the message or call can pass through different networks in the path to its destination. In Shaken/Stir, the originating operator uses its private key to sign a portion of the SIP information which includes the calling and called party and places this information in a SIP message Identity header. The terminating network equipment will identify calling and called party information in the SIP message and determine if the call signature in the Identity header matches. The terminating operator verifies the signature by using the public key of the originating operator. An attestation level corresponds to how certain the signature is valid or message is valid.

An exemplary model/algorithm in accordance with the present invention will now be discussed in connection with a first Operator's network.

At the entry point to a first Operator's network, for each initial SIP INVITE request received from another operator, delete or alternatively mark all History-Info/Diversion headers present in the initial received SIP INVITE request, which matches the first Operator's own domain name/IP Address list/matching criteria. Optionally use existing Identity(div) headers for this purpose as follows: if an Identity(div) claim matches the first Operator criteria (e.g., its includes the first Operator's domain name or IP address) and if it verifies successfully, find/identify the corresponding History-Info/Diversion header(s) in the received SIP INVITE request and delete or alternatively mark each of the identified corresponding History-Info/Diversion header(s). This step will ensure that if a call is previously diverted by the first Operator and then received by the first Operator again from another Operator, (e.g., a second Operator) a duplicate Identity(div) is not generated for previous diversions by this first Operator.

At the entity and/or device in the first Operator's network which is expected to generate any Identity(div) headers, determine the list of History-Info/Diversion headers added by the first Operator. If the list includes both History-Info and Diversion headers, use only the subset including one. Whether the History-Info headers or Diversion headers should be preferred is configurable and default behavior is to use the History-Info headers. Using only History-Info headers or Diversion headers is needed as there is no standard way of ordering a mixture of History-Info and Diversion headers.

Next, eliminate duplicates in the list of History-Info/Diversion headers added by the first Operator. Elimination of duplicates is needed as History-Info/Diversion headers may be present as a result of being added without actually implementing a change in the target or destination, either intentionally, e.g. when a SIP address userpart remained the same but the SIP address hostpart was changed to send the request to a registered address, or due to a bug/unintended behavior by equipment in the first Operator's network. This elimination of duplicates in the list of History-Info headers or the list of Diversion headers is achieved by comparing the canonical form for TN (i.e., telephone number) based list members to identify duplicates. Optionally, History-Info rc/np/mp parameters included in the History-Info headers may also be used, and in some embodiments are used, to identify History-Info duplicate headers. It should be noted however, that these History-Info parameters are not always populated properly and relying solely on them for eliminating duplicate History-Info headers is not optimal and may result in errors, e.g., when the parameters are improperly populated.

In the next step of the algorithm/model Identity(div) header(s) are generated for diversions which occurred in the first Operator's network. In one embodiment, a single Identity(div) representing a single diversion is generated/added for a plurality of diversions which occurred in the first Operator's network. For example, diversions from A to B to C to D (i.e., A=>B=>C=>D) would result in Identity (div) for A to D (i.e., A=>D). Optionally, a separate Identity(div) is generated/added for each distinct diversion which has happened in the first Operator's network. For example, A=>B=>C=>D would in this case result in Identity(div) for A=>B, Identity(div) for B=>C, Identity(div) for C=>D. In generating the Identity(div) headers, equipment in the first Operator's network uses existing Identity(div) headers to determine the starting point for Identity(div) header(s) to be added. Optionally, the algorithm includes checking that existing Identity(div) headers form an unbroken chain. If this check fails, optionally do not add new Identity(div) headers.

FIG. 1 illustrates an exemplary communications system 100 in accordance with an embodiment of the present invention. The exemplary communications system 100 includes a plurality of communications networks which are illustrated as Operator-1 network 102, Operator-2 network 112, Operator-3 network 130, Operator-4 network 140, . . . , Operator-N network 148, where N is a positive integer number greater than 4, coupled together via communications links 160, 162, 164, 166, and 168.

Operator-1 Network 102 includes a IP Multimedia Core Network Subsystem 1 (IMS Core 1) 106, user equipment devices UE A 104, UE B 110, and an Interconnect Border Control Function entity or device 1 (IBCF 1) 108. The elements of the Operator-1 Network 102 are coupled together via communications links.

Operator-2 Network 112 includes a IP Multimedia Core Network Subsystem 2 (IMS Core 2) 116, a plurality of ICBF entities or devices (IBCF 2 114, IBCF 3 118, IBCF 4 120, IBCF 5 122, . . . , IBCF M 124, M being an integer number), and a plurality of User Equipment devices (UE C 126 and UE E 128). The elements of the Operator-2 Network 112 are coupled together via communications links.

Operator-3 Network 130 includes a IP Multimedia Core Network Subsystem 3 (IMS Core 3) 134, a plurality of ICBF entities or devices (IBCF 7 132, IBCF 8 136) and a User Equipment device (UE D 138). The elements of the Operator-3 Network 130 are coupled together via communications links.

Operator-4 Network 140 includes a IP Multimedia Core Network Subsystem 4 (IMS Core 4) 144, an ICBF entity or device (IBCF 9 142) and a User Equipment device (UE F 146). The elements of the Operator-4 Network 140 are coupled together via communications links.

Operator-N Network 148 includes a IP Multimedia Core Network Subsystem N (IMS Core N) 152, an ICBF entity or device (IBCF 10 154) and a User Equipment device (UE G 150). The elements of the Operator-4 Network 140 are coupled together via communications links.

The communications link 160 couples the ICBF 1 108 of the Operator-1 Network 102 to the IBCF 2 114 of the Operator-2 Network 112. The communications link 162 couples the ICBF 3 118 of the Operator-2 Network 112 to the IBCF 7 132 of the Operator-3 Network 130. The communications link 164 couples the ICBF 8 136 of the Operator-3 Network 130 to the IBCF 4 120 of the Operator-2 Network 112. The communications link 166 couples the ICBF M 124 of the Operator-2 Network 112 to the IBCF 10 154 of the Operator-N Network 148. The communications link 168 couples the ICBF 5 122 of the Operator-2 Network 112 to the IBCF 9 142 of the Operator-4 Network 140.

The communications links may be wired, optical, and/or wireless communications links. It is to be understood that the communication links shown in system 100 are only exemplary and other network configurations and communications links may be employed that couple together the networks, devices, and entities of the system 100.

An Interconnect Border Control Function (IBCF) entity or device is network equipment that provides boundary control between various service provider networks, providing IMS network security in terms of signaling information. An IBCF entity or device interconnects its operator network to other networks, e.g., IMS networks. The IBCF entity or device serves as an entry and exit point to the IP Multimedia Core Network (IMS core) when Session Initiation Protocol messaging is routed between two different IMS networks. The IBCF entity or device provides, among other things, screening of SIP signaling and security operations. In some embodiments, IBCF entities and/or devices are Session Border Controllers positioned at the IMS core edge. The Session Border Controllers including IBCF functionality and in some embodiments also including TrGW (Transition Gateway) functionality therein providing Border Control Functions. In some embodiments, the ICBF entities are virtual devices implemented on a compute node in a cloud environment or network. The compute node including a processor and memory or being attached to memory.

While for the sake of simplicity in explaining the invention, the exemplary operator networks of exemplary system 100 have only been shown with one or a few user equipment devices and IBCF devices it is to be understood that typically each operator networks include a large plurality of user equipment devices and ICBF devices. The user equipment devices include communications devices including for example computes, laptops, tablets, smartphones, mobile communications devices, stationary communications devices, etc.

Elements or steps with the same reference numbers used in different figures are the same or similar and those elements or steps will not be described in detail again.

Figure 2B:
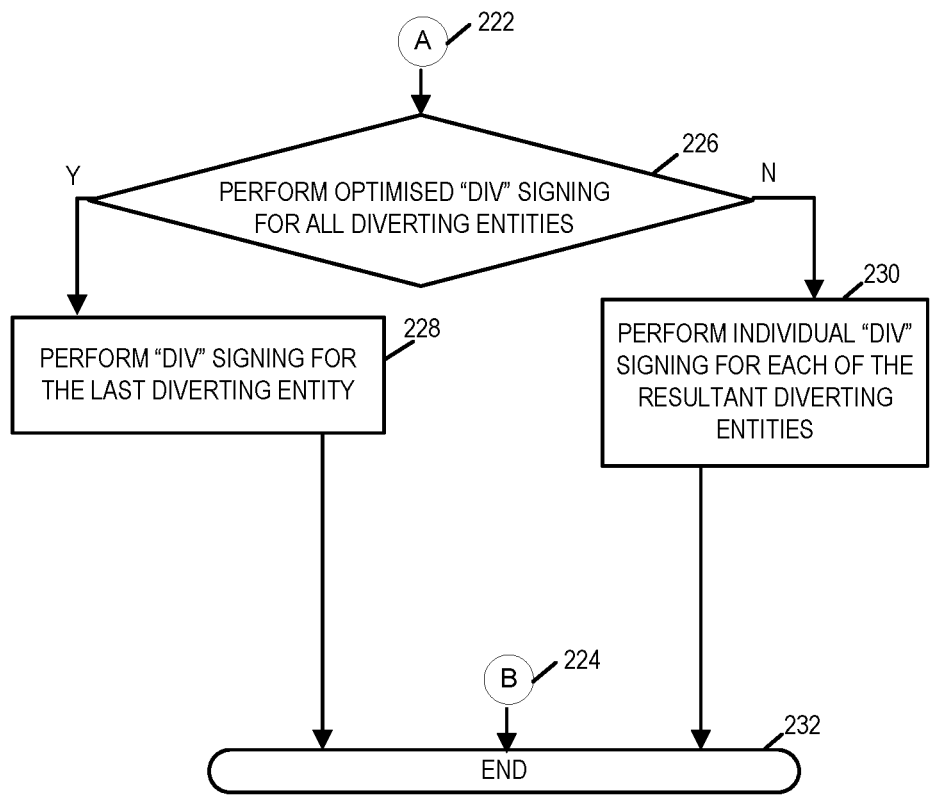
FIG. 2B illustrates a second part of an exemplary method in accordance with an embodiment of the present invention.

FIG. 2 comprises FIGS. 2A and 2B. FIG. 2A illustrates a first part of a flowchart of an exemplary method 100 which illustrates the steps for a "div" signing procedure in accordance with an embodiment of the present invention. FIG. 2B illustrates a second part of a flowchart of an exemplary method 200 which illustrates the steps for a "div" signing procedure in accordance with an embodiment of the present invention. The method 200 may be, and in some embodiments is, implemented on system 100 shown in FIG. 1. It should be understood that system 100 is only an exemplary system and that the method 200 is applicable to other systems.

Operation begins in start step 202. Operation proceeds from step 202 to decision step 204. In decision step 204, a determination is made whether the History-Info/Diversion header domain matches the first Operator's domain. When the determination is that the History-Info/Diversion header domain does match the first operator's domain operation proceeds from step 204 to step 210. When the determination is that the History-Info/Diversion header domain does not match the first Operator's domain, operation proceeds from step 204 to step 206.

In step 206, all History-Info and diversion entries where the host part of the Fully Qualified Domain Name (FQDN) is not in the configured Domain list of the first Operator are removed. The domain list is a list of domains for which the first Operator will sign. For example, the first Operator's devices may be configured with a domain list of a single entry "Operator1.com". Such devices, e.g., Interconnect Border Control Function devices, then will only sign entries with the domain "Operator1.com" and will not sign entries with another domain name (e.g., Operator3.com"). In some embodiments, optional step 208 is also performed. In optional step 208, received Identity(div) headers are verified and only the ones for which there is no corresponding validating Identity(div) are deleted. Operation proceeds from step 206 to step 210.

In step 210, all History-Info and diversion entries that have an existing "div" Identity header are removed or marked as "already has identity". In some embodiments optionally step 212 is performed. In optional step 212, the signature for Identity(div) headers with a domain matching the first Operator's domain is verified. Operation proceeds from step 210 to step 214.

In step 214, History and Diversion headers that do not have a userinfo part are removed, i.e., they are determined to not be used for signing (generating SIP Identity div headers). However, it should be noted that they are not removed from the SIP Invite request. Operation proceeds from step 214 to step 216.

In step 216, History and Diversion headers that are duplicates (e.g., userpart is the same but hostpart is different or changed) are removed, i.e., they are determined to not be used for signing (generating SIP Identity div headers). However, it should be noted that they are not removed from the SIP Invite request. Operation proceeds from step 216 to step 218.

In step 218, a decision or choice is made as to whether History-Info or Diversion headers are to be signed. Operation proceeds from step 218 to step 220.

In decision step 220, a determination is made as to whether the chain is intact for existing "div" identity headers. This may be, and typically is, done by decoding a non-encrypted portion of SIP Identity headers without the need for decryption. If the determination is that the chain is intact operation proceeds from step 220 via connection node A 222 to step 226 shown on FIG. 1B. If the determination is that the chain is not intact operation proceeds from step 220 via connection node B 224 to the end step 232 shown on FIG. 1B.

In decision step 226, a decision is made as to whether to perform optimized "div" signing for all diverting entities or not. When the decision is to perform optimized "div" signing for all diverting entities operation proceeds from step 226 to step 228. When the decision is to not perform optimized "div" signing for all diverting entities operation proceeds from step 226 to step 230.

In step 228, "div" signing is performed for the last diverting entity. Operation proceeds step 228 to end step 232.

In step 230, individual "div" signing is performed for each of the resultant diverting entities. Operation proceeds from step 230 to end step 232.

In end step 232, the method 200 ends as the process is completed.

FIG. 6 illustrates an exemplary SIP signaling diagram and method 6000 for a call flow in accordance with an embodiment of the present invention. FIG. 6 comprises FIGS. 6A, 6B, 6C, 6D, and 6E. FIG. 6A illustrates the first part of the exemplary signaling diagram and method 6000 in accordance with an embodiment of the present invention. FIG. 6B illustrates the second part of the exemplary signaling diagram and method 6000 in accordance with an embodiment of the present invention. FIG. 6C illustrates the third part of the exemplary signaling diagram and method 6000 in accordance with an embodiment of the present invention. FIG. 6D illustrates the fourth part of the exemplary signaling diagram and method 6000 in accordance with an embodiment of the present invention. FIG. 6E illustrates the fifth part of the exemplary signaling diagram and method 6000 in accordance with an embodiment of the present invention.

It should be understood that the signaling diagram 6000 illustrates those messages and the features of those messages important to understanding the invention and that additional signaling messages typically are exchanged among the various components of the systems in practice. Similarly, typically the messages shown also have additional features. For explanatory purposes exemplary signaling diagram/method 6000 has been shown as being implemented on exemplary system 100. It is to be understood that the method may be implemented on other systems.

The call flow illustrated in FIG. 6 shows the Identity "div" signing procedure for Operator 2 in accordance with an embodiment of the present invention. Operation begins in step 6002 wherein the system 100 is initialized. In some embodiments, the initialization includes each operator network configuring the IBCF devices that will be performing Identity(div) signatures to be configured to perform the Identity (div) signatures using either SIP History-Info header information or SIP Diversion header information. Each operator may choose either the SIP History-Info header information or SIP Diversion header information. The SIP History-Info header information is typically the default as the header is an approved standard and more widely used.

While the Diversion header has been implemented by many operators, it is only a proposal with the RFC never be approved. In this example, the Operator-2 network will be implementing the exemplary method of the invention. It configures the IBCF devices of the Operator-2 network 112 to perform Identity (div) signing using SIP History-Info header information. In some embodiments, the operator configures the IBCF devices to only generate and use SIP History-Info header information and not Diversion headers. In some embodiments, in which the operator chooses to configure its IBCF devices to perform Identity (div) signatures using SIP Diversion header information, the operator may also chose to configure its IBCF devices to only generate and use SIP Diversion header information and not SIP History-Info header information. Once the devices of the system 100 have been initialized and configured. Operation proceeds from step 6002 to step 6004.

In step 6004, the user equipment device UE A 104 within Operator-1 Network 102, generates a SIP INVITE request 6008. The UE A 104 has telephone number (TN) 5616001001. The SIP INVITE request 6008 includes the request line INVITE "tel:5616001002" with "tel" indicating that the address is Tel: URI which is a telephone Uniform Resource Identifier. The tel URI of a SIP INVITE is typically changed by a SIP proxy that converts the telephone number to a SIP address through a database lookup. In this example, the telephone number 5616001002 is associated with and/or assigned to UE B 110 which is also located in the Operator-1 network 102. Operation proceeds from step 6004 to step 6006.

In step 6006, UE A 104 transmits SIP INVITE request 6008 to the IMS core 1 106. Operation proceeds from step 6006 to step 6010.

In step 6010, the IMS core 1 106 receives the SIP INVITE request at step 6010. Each of the IMS cores in system 100 including the IMS core 1 106 includes network equipment, e.g., one or more network equipment devices, that perform various operations including processing and routing of SIP signaling messages and implementing various features such as call forwarding, transfer, etc. When referring to an IMS core as performing an operation, it refers to one or more network equipment devices in the IMS core as performing the operation. Operation proceeds from step 6010 to step 6012.

In step 6012, the IMS core 1 106 processes the received SIP INVITE request 6008 and determines that the intended destination UE B (5616001002) belongs to the Operator-1 network 102. The IMS core also determines that call forwarding has been enabled for UE B (5616001002) to forward, i.e., divert, all incoming calls to UE C (5617001001). UE C 126 belongs to or is located in Operator-2 Network 112. Operation proceeds from step 6012 to step 6014.

In step 6014, the IMS core 1 106 generates SIP INVITE request 6018 based on SIP INVITE request 6008. The SIP INVITE request message 6008 includes the request line including the SIP address of UE B which 5617001002@Operator2.com. The SIP address includes the telephone number 5617001002 which is the user information part and the domain of the Operator-2 network which appears after the @ symbol. The domain is the host part of the SIP address and in the SIP INVITE request 6008 is Operator2.com. The History-Info header field includes the entry 5616001002@Operator1.com which is the SIP URI of UE B (5616001002) which is identifier of the initial target of the call and is also the forwarding UE. The From header indicates from whom the SIP INVITE has been initiated and the To indicates the address to which the SIP INVITE is being sent. The P-Asserted-Identity header provides calling party identification information which is identification information for UE A (5616001001). It should be noted that the devices in the Operator-1 Network 112 have been configured to use History-Info headers as opposed to Diversion headers in this example. Operation proceeds from step 6014 to step 6016.

In step 6016, IMS core 1 106 transmits the SIP INVITE request 6018 to IBCF device 1 108 which is a Interconnect Boundary Control Function device connecting Operator-1 network 102 to Operator-2 network 112. Operation proceeds from step 6016 to step 6020.

In step 6020, IBCF 1 108 receives the SIP INVITE request 6018. Operation proceeds from step 6020 to step 6022.

In step 6022, IBCF 1 108 processes the SIP INVITE request 6018 and determines that the target or destination of the request is located in Operator-2 network 112. Operation proceeds from step 6022 to step 6024.

In step 6024, IBCF 1 108 generates SIP INVITE request 6028. In this example, the initial call forwarding happened at the Operator-1 network 102 which has the capability to sign the call. The SIP INVITE request 6028 is generated based on information contained in the SIP INVITE request message 6018. Generating SIP INVITE request 6028 includes generating Identity shaken and div headers which signs the call for both "shaken" and "div" ppt extensions in accordance with the procedures of the STIR/SHAKEN protocols. The SIP Identity header includes, among other things, the following data Calling number, Called number(s), Current timestamp, Attestation level, and Origination identifier. For the sake of simplicity in explaining the invention, the Identity header information will be represented as calling UE→called UE.

In this example, IBCF 1 108 is configured to generate Identity div headers based on History-Info header information. In this case, the SIP INVITE request 6028 includes the Identity header information:

Identity: <ppt=shaken>(A→B)
Identity:<ppt=div>(B→C)

The Identity shaken information contains information for the initial request (originating identity and target/destination identity) and the Identity div information contains information for the forwarding or diversion of the call from its original target UE B to its forwarded or diverted target UE C. For example, Identity(div) [orig=A dest=B div=C]. The Orig address remains the same throughout the call which is the original calling number. In some embodiments, the History-Info header information that helps correlate a Identity (div) header entry to a History-Info header entry is also included in the Identity (div) information, e.g., a hi-index number.

Operation proceeds from step 6024 to step 6026. In step 6026, the IBCF 1 108 located in Operator-1 network 102 transmits SIP INVITE request 6028 to Operator-2 Network 112. Operation proceeds from step 6026 to step 6030 shown on FIG. 6B.

In step 6030, IBCF 2 114 located in Operator-2 Network 112 receives the SIP INVITE request 6028. The SIP INVITE request 6028 being addressed to SIP address 5617001001@Operator2.com which corresponds to or is assigned to UE C 126 which is located in Operator-2 Network 112. The UE C (5617001001) may also be referred to as belonging to Operator-2 Network 112. Operation proceeds from step 6030 to step 6032.

In step 6032, the IBCF 2 114 which is located in Operator-2 Network 112, determines whether or not the received SIP INVITE request 6028 was previously diverted by the Operator-2 Network 112, e.g., by IMS Core 2 116 and/or network equipment located in the IMS Core 2 116. Determining whether or not the received SIP INVITE request 6028 was previously diverted includes determining if any of the identity (div) claims in the received SIP INVITE request 6028 matches, meets or fulfills a first matching criteria of the Operator-2 Network 112. The first matching criteria being based on Operator-2 Network 112 identity information (e.g., a domain name of the Operator-2 Network 112 or an IP address of the Operator-2 Network 112). In this example, the first matching criteria is whether any successfully verified identity (div) claims of the received SIP INVITE request include a domain name of a diverting entity which matches the Operator-2 Network 112 domain name or includes an Internet Protocol address matching an IP address of the Operator-2 Network 112.

In this example, IBCF 2 114 verifies the "shaken" and "div" identity. IBCF 2 114 determines from the identity (div) claim information (B→C) that the diverting entity identity (sometimes referred to as destination identity or dest.) is entity identity UE B (5616001002@Operator1.com) and that the diverted to entity is entity identity UE C (5617001001@Operator2.com). The Operator-2 Network domain name is Operator2.com. The IBCF 2 114 identifies the diverting entity UE B's domain name to be Operator1.com. The IBCF 2 compares the diverting entity domain name Operator1.com to the Operator-2 Network domain name Operator2.com and determines that the diverting entity domain name does not match the domain name of the Operator-2 Network. IBCF 2 114 determines that the SIP INVITE request 6028 was not a SIP INVITE request that was previously diverted by the Operator-2 Network 112 as it not meet the first matching criteria. When the SIP INVITE request is determined to not have been previously diverted by the Operator-2 Network 112, the Operator-2 Network 112 proceeds to process the received SIP INVITE request at the Operator-2 Network 112 as a new SIP INVITE request, i.e., a SIP INVITE request that has not been previously diverted to the Operator-2 network. In determining whether a SIP Identity div header matches or correlates to a SIP History-Info header or SIP Diversion header, a portion of the SIP Identity div header once decoded provides "orig", "dest" and "div" values. In correlating the SIP Identity div header to a SIP History-Info or aSIP Diversion header, the "div" value from the decoded SIP Identity div header portion must match the address value in the History-Info and/or Diversion header in the SIP INVITE signaling for a match or a correlation to be found between the SIP Identity div header and the SIP History-Info header or SIP Diversion header. Operation proceeds from step 6032 to step 6034.

In step 6034, the IBCF-2 114 generates SIP INVITE request 6038 based on SIP INVITE request 6028. Generating SIP INVITE request 6038 includes updating the SIP INVITE request to include a verstat parameter that reflects the verification results of the verification process performed on the "shaken" and "div" identities. In this example, the verstat parameter is a tel URI parameter included within the P-Asserted-Identity (PAI) header which includes information indicating that the "shaken" and "div" identities where successfully verified. Alternatively, the verstat parameter may be included in the From header information. In generating the SIP INVITE request 6038, IBCF 2 114 includes the identity headers which were verified so that it can transparently pass them to the IMS core 2 116. Operation proceeds from step 6034 to step 6036.

In step 6036, IBCF 2 114 transmits the generated SIP INVITE request 6038 to IMS Core 2 116 for additional processing therein transparently passing the Identity headers which have been verified without modification to the IMS Core 2 116.

In step 6040, the IMS Core 2 116, e.g., IMS Core 2 network equipment, receives the SIP INVITE request 6038. Operation proceeds from step 6040 to step 6042.

In step 6042, the IMS Core 2, 116, e.g., IMS Core 2 network equipment, performs further processing of the received SIP INVITE request 6038. The IMS core 2 116 determines based on information in the SIP INVITE request message 6038 that the terminating subscriber of the SIP INVITE request 6038 is UE C (5617001001) based on the sip address 5617001001@Operator2.com. The IMS core 2 116 further determines based on the domain of SIP address which is Operator2.com that the address belongs to and/or is assigned to the Operator-2 Network 112. The IMS core 2 116 further determines that call forwarding has been enabled for this SIP address and/or terminating subscriber UE C (5617001001) to another subscriber UE D (5618001001) who belongs to and/or is assigned to Operator-3 Network 130. Operation proceeds from step 6042 to step 6044.

In step 6044, the IMS Core 2 116 generates SIP INVITE request 6048 based on SIP INVITE request 6038. Generating SIP INVITE request 6048 includes generating a new request line which includes the SIP address of the UE C (5617001001) to which the call (i.e., SIP INVITE request) is being diverted or forwarded—"INVITE sip: 5618001001@Operator3.com", anew History-Info header—"History-Info: 5617001001@Operator2.com" and a new Diversion header—"Diversion: 5617001001@Operator2.com". The verstat parameter is deleted or dropped as the SIP INVITE request 6048 is to be sent from the IMS core to an IBCF and not to a subscriber within the second communications network. In some embodiments, the network operators only uses a History-Info header or a Diversion header. The History-Info header is typically the default header. In this example both History-Info and Diversion headers are provided. Operation proceeds from step 6044 to step 6046.

In step 6046, the IMS Core 2 116 transmits the generated SIP INVITE request 6048 to IBCF 3 118 located at the edge, i.e., exit point, of the Operator-2 Network 112. IBCF 3 118 is coupled to Operator-3 Network 130 to which the SIP INVITE request/call initiation request is being forwarded. Operation proceeds from step 6046 to step 6050.

In step 6050, IBCF 3 118 receives the SIP INVITE request 6048 from the IMS Core 2 116. Operation proceeds from strep 6050 to step 6052.

In step 6052, the IBCF 3 118 processes the received SIP INVITE request 6048. As signing is efficient if performed at the network boundaries, the IBCF 3 118 performs shaken/stir signings for the call/call diversions for which Operator-2, e.g., the devices within the Operator-2 Network 112, are responsible. In this example, since IBCF 1 108 of the Operator-1 Network 102 has already performed "shaken" signing, the IBCF 3 118 performs only Identity "div" signing for the diversions occurring at the Operator-2 Network 112 and uses the "shaken" and "div" Identity headers received from the IBCF 1 108 as is. These "shaken" and "div" headers had been verified at the entry to the Operator-2 network by IBCF 2 114. As part of processing the received SIP INVITE request 6048, in some embodiments the IBCF 2 118 determines if the call/SIP INVITE request 6048 has been diverted by entities or devices within the Operator-2 Network 112, e.g., by IMS Core 2 116 equipment. The determination is made based on History-Info header information or Diversion header information. If both History-Info and Diversion headers are present in the received SIP INVITE request then only one of the two headers (History-Info header or Diversion header) is used for signing. Which of the History-Info header or the Diversion header which will be used for signing may be, and in some embodiments is, configurable. The default configuration being that History-Info headers are used for signing when both are History-Info and Diversion headers are present. The IBCF 3 118 does not use information from both History-Info headers and Diversion headers for signing. It chooses only one of the two as there is no reliable way to include both. In this case, the determination is that a diversion was made by the Operator-2 Network 112 based on the History-Info: 5617001001@Operator2.com header information. The Identity: <ppt-div>(C→D) identity diversion header is generated as part of step 6052 based on History-Info: History-Info: 5617001001@Operator2.com information. Operation proceeds 6052 to step 6054.

In step 6054, IBCF 3 118 generates SIP INVITE request 6058 based on SIP INVITE request 6048. SIP INVITE request 6058 includes the Identity: <ppt=div> (C→D) identity diversion headed generated in step 6052. In some embodiments, step 6054 includes the generation of the Identity: <ppt=div> (C→D) identity diversion header instead of step 6052. Operation proceeds from step 6054 to step 6056.

Figure 6B:
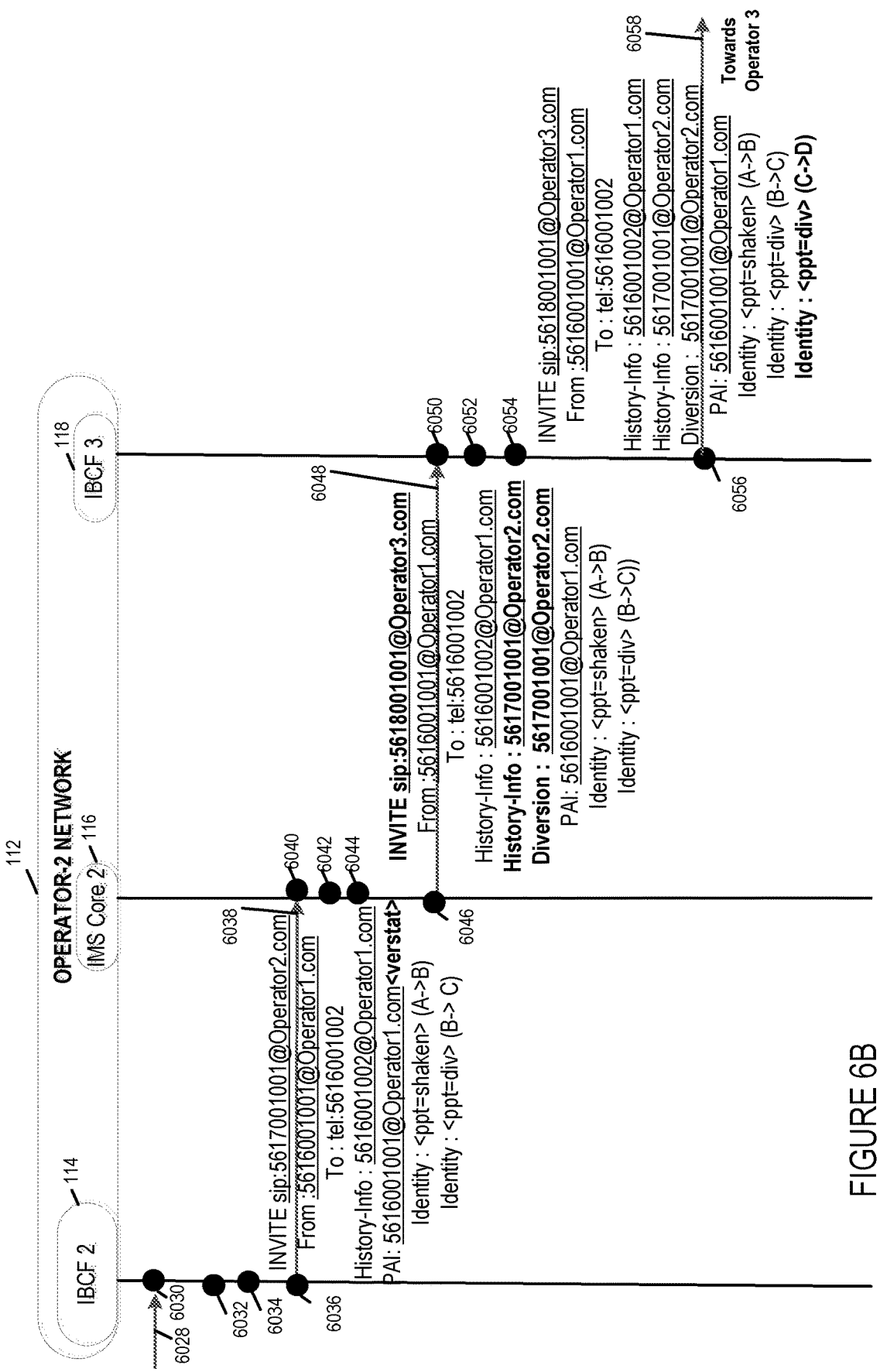
FIG. 6B illustrates a second part of exemplary signaling flow diagram with accompanying methods steps of an exemplary method in accordance with an embodiment of the present invention.
Figure 6C:
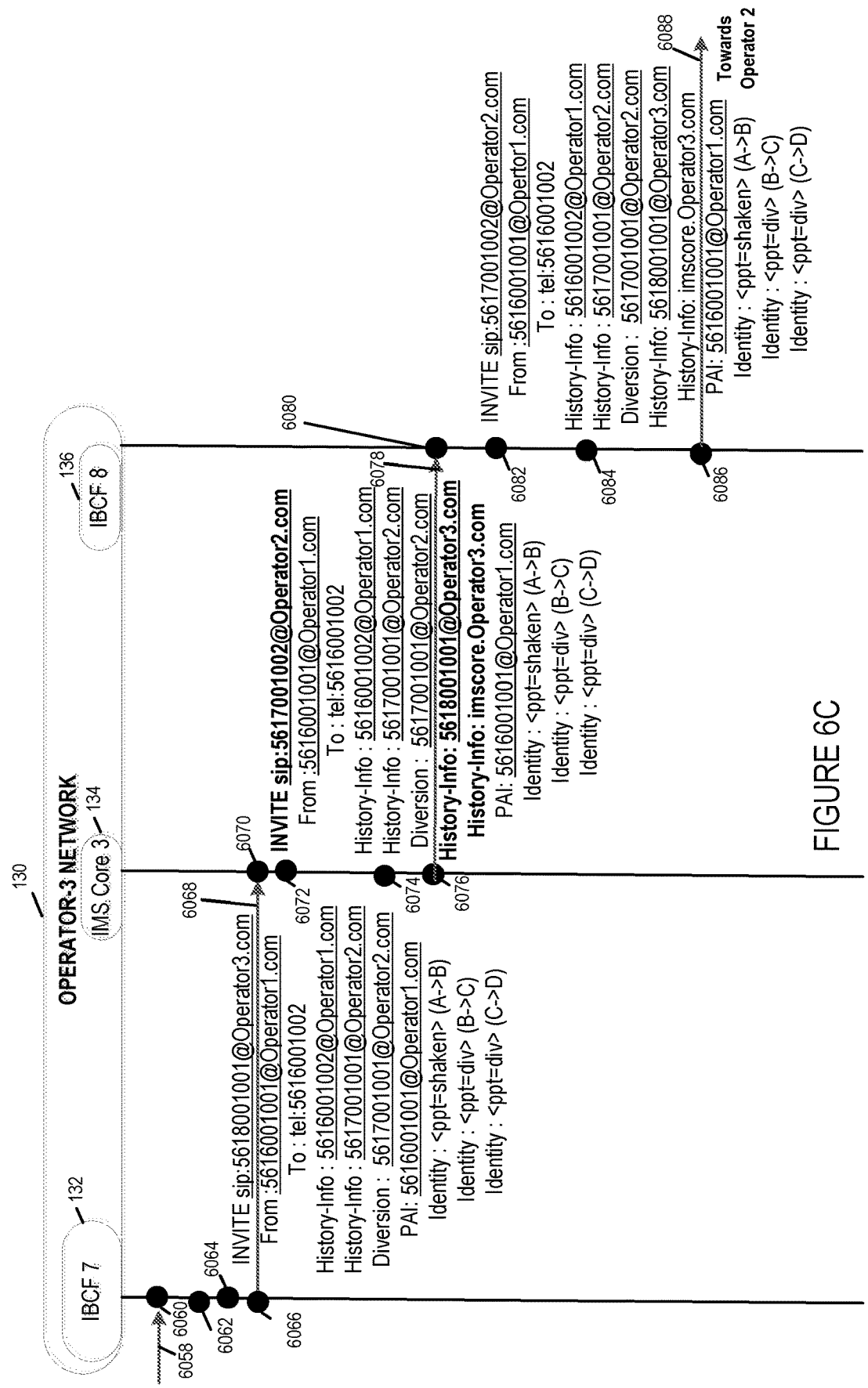
FIG. 6C illustrates a third part of exemplary signaling flow diagram with accompanying methods steps of an exemplary method in accordance with an embodiment of the present invention.
Figure 6D:
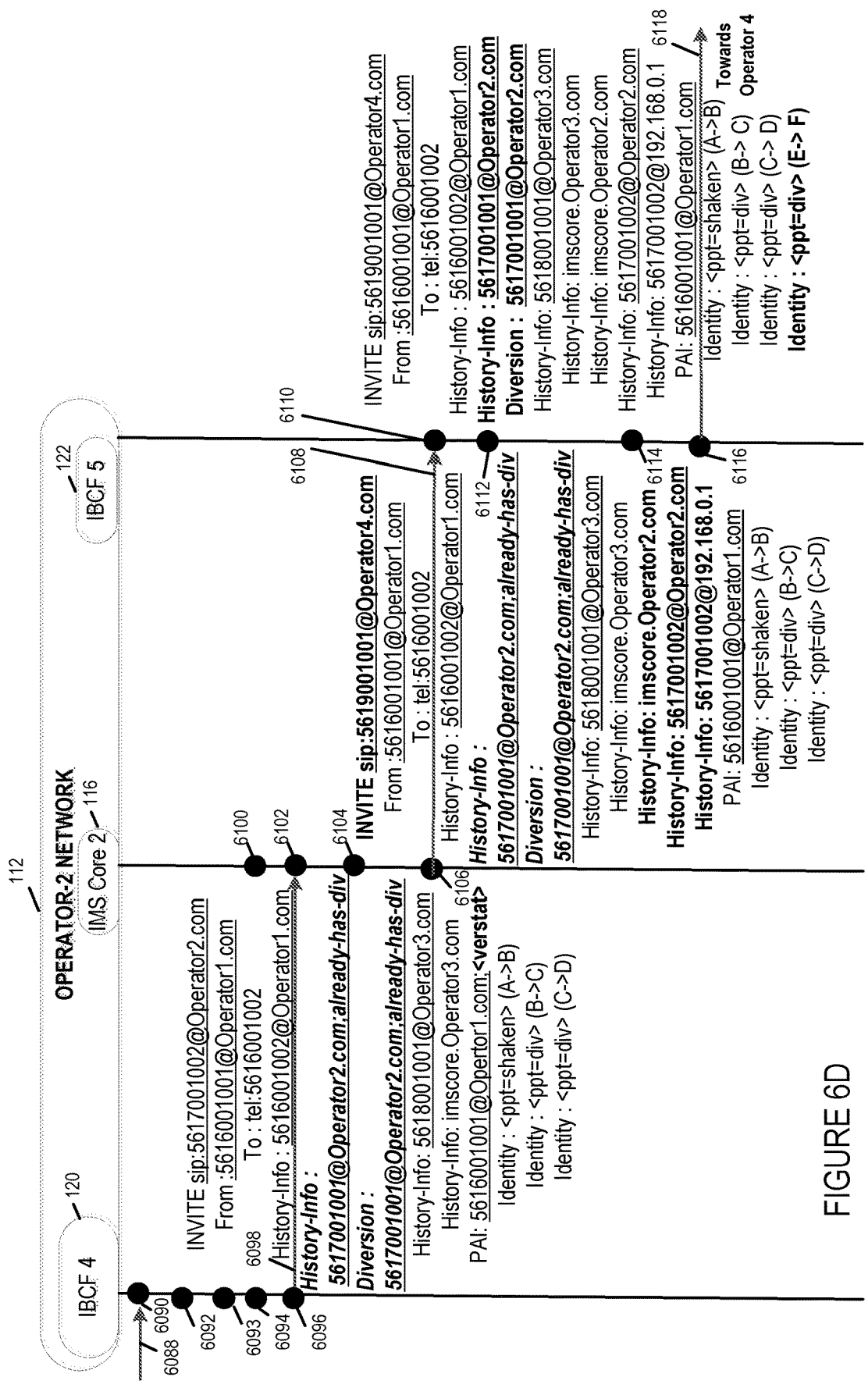
FIG. 6D illustrates a fourth part of exemplary signaling flow diagram with accompanying methods steps of an exemplary method in accordance with an embodiment of the present invention.

In step 6056, the IBCF 3 118 transmits from the Operator-2 Network 112 the SIP INVITE request message 6058 to IBCF 7 132 located at the Operator-3 Network 130 shown on FIG. 6C. Operation proceeds from step 6056 to step 6060.

In step 6060, the IBCF 7 132 at the Operator-3 Network 130, receives the SIP Request 6058. Operation proceeds from step 6060 to step 6062 wherein IBCF-7 processes the received SIP INVITE request 6058. IBCF 7 132 determines that the SIP INVITE request 6058 is destined for the terminating subscriber UE D (561800100@Operator3.com) which is located at the Operator-3 Network 130. The Operator-3 Network 130 does not support STIR/SHAKEN procedures and hence will transparently pass all the Identity headers to its IMS core 3 134. Operation proceeds from step 6062 to step 6064.

At step 6064, the IBCF 7 132 generates SIP INVITE request 6068 based on the SIP INVITE request 6058. In generating the SIP INVITE request 6068, the Identity headers received in the SIP INVITE request 6058 as previously explained the Operator-3 Network 130 does not support STIR/SHAKEN procedures but transparently passes the Identity headers. Operation proceeds from step 6064 to step 6066.

In step 6066, the IBCF 7 132 transmits the SIP INVITE request 6068 to the IMS Core 3 134. Operation proceeds from step 6066 to step 6070.

In step 6070, the IMS Core 3 134 receives the SIP INVITE request 6068. Operation proceeds from step 6070 to step 6072.

In step 6072, the IMS core 3 134 determines that terminating subscriber UE D (5618001001) 138 belongs to Operator-3 Network 130. The IMS core 3 134 further determines that UE D (5618001001) 138 has enabled call forwarding to another subscriber UE E (5167001002) which belongs to the Operator-2 Network 112. Network equipment devices in the IMS Core 3 generate the following two History-Info headers:

History-Info 5618001001@Operator3.com
History-Info: imscore@Operator3.com

The first History-Info header is History-Info 5618001001@Operator3.com which identifies UE D 138 which was the terminating subscriber that is forwarding the call/SIP INVITE request. The second History-Info header is History-Info: imscore.Operator3.com does not include a user information part separated by @ symbol and a host part including a domain. The URI is missing a user part, it only contains a hostname which is "ims" and a domain which is "Operator3.com". This indicates that the second History-Info header which does not include a user part was not added because of a SIP INVITE diversion or call diversion, but simply indicates that a traversal of an IMS node occurred. Operation proceeds from step 6072 to step 6074.

In step 6074, SIP INVITE request message 6078 is generated by the IMS core 3 based on SIP INVITE request message 6068. The request line INVITE sip: 6617001002@Operator2.com includes the SIP address for the subscriber UE E (5167001002) 128 which belongs to and/or is located within the Operator-2 Network 112. The two History-Info headers History-Info: 5618001001@Operator3.com and History-Info: imscore.Operator3.com are included in the SIP INVITE request message 6078. Operation proceeds from step 6074 to step 6076.

In step 6076, IMS core 3 134 transmits the SIP INVITE request 6078 to IBCF 8 136 which is at the boundary of the Operator-3 Network 130 and interconnects the Operator-3 Network 130 and the Operator-2 Network 112. In some embodiments, the SIP INVITE request 6078 could be transmitted to IBCF 7 132 instead of IBCF 8 136 as IBCF 7 132 also interconnects the Operator-3 Network 130 and the Operator-2 Network 112 as previously discussed. Operation proceeds from step 6076 to step 6080.

In step 6080, the IBCF 8 136 receives the SIP INVITE request 6078. Operation proceeds from step 6080 to step 6082. In step 6082, IBCF 8 136 processes the received SIP INVITE request 6078. As previously discussed the Operator-3 Network 130 does not support STIR/SHAKEN procedures and therefore will not add any "div" Identity header for the diversion that has occurred in the Operator-3 Network 130. The IBCF 8 136 will determine that the SIP INVITE request 6078 is to be routed to the Operator-2 Network 112. Operation proceeds from step 6082 to step 6084.

In step 6084, IBCF 8 136 generates SIP INVITE request 6088 based on SIP INVITE request 6078. SIP INVITE request 6088 includes the two SIP History-Info headers added by devices of the Operator-3 Network 130, e.g., IMS core 3 devices, and the Identity headers received by the IBCF 7 without modification or any additional div Identity header for the diversion which occurred within the Operator-3 Network 130. Operation proceeds from step 6084 to step 6086.

In step 6086, IBCF 8 136 transmits SIP INVITE request 6088 to IBCF 4 120 located within and on the edge of Operator-2 Network 112. Operation proceeds from step 6086 to step 6090.

In step 6090, the IBCF 4 120 located within and at the edge of the Operator-2 Network 112, receives the SIP INVITE request 6088 from the IBCF 8 136 located in the Operator-3 Network 130. The IBCF 4 120 acting as an entry point of the Operator-2 network 112 for the ingress SIP INVITE request 6088. Operation proceeds from step 6090 to step 6092.

In step 6092, the IBCF 4 120 processes the received ingress SIP INVITE request 6088. Processing the SIP INVITE request includes determining whether or not the SIP INVITE request 6088 was previously diverted by the Operator-2 Network 112, e.g., by network equipment within the Operator-2 Network 112, to another Operator Network and when the SIP INVITE request is determined to have been previously diverted by the Operator-2 Network 112 to another network, processing the SIP INVITE request 6088 at the Operator-2 Network 112 as a previously received and diverted SIP Invite request, and when the SIP INVITE request 6088 is determined to not have been previously diverted by the Operator-2 Network 112 to another Operator Network, processing the SIP INVITE request 6088 as a new SIP Invite request, i.e., a SIP INVITE request that has not been previously diverted by the Operator-2 Network 112 to another Operator-2 Network.

Determining whether or not the received SIP INVITE request 6088 was previously diverted includes determining if any of the identity (div) claims in the received SIP INVITE request 6088 matches, meets or fulfills the first matching criteria of the Operator-2 Network 112. As previously discussed, the first matching criteria being based on Operator-2 Network 112 identity information (e.g., a domain name of the Operator-2 Network 112 or an IP address of the Operator-2 Network 112). In this example, the first matching criteria is whether any successfully verified identity (div) claims of the received SIP INVITE request include a domain name of a diverting entity which matches the Operator-2 Network 112 domain name or includes an Internet Protocol address matching an IP address of the Operator-2 Network 112.

In this example, IBCF 4 120 verifies the "shaken" and "div" identity and adds a verstat indicating a successful verification. IBCF 4 120 determines from the identity (div) claim information (B→C) that the diverting entity identity (sometimes referred to as destination identity or dest.) is entity identity UE B(5616001002@Operator1.com) and that the diverted to entity is entity identity UE C (5617001001@Operator2.com). The Operator-2 Network domain name is Operator2.com. The IBCF 4 120 identifies the diverting entity UE B's domain name to be Operator1.com. The IBCF 4 compares the diverting entity domain name Operator1.com to the Operator-2 Network domain name Operator2.com and determines that the diverting entity domain name does not match the domain name of the Operator-2 Network.

IBCF 4 120 determines from the identity (div) claim information (C→D) that the diverting entity identity (sometimes referred to as destination identity or dest.) is entity identity UE C (5617001001@Operator2.com) and that the diverted to entity is entity identity UE D (5618001001@Operator3.com). The Operator-2 Network domain name is Operator2.com. The IBCF 4 120 identifies the diverting entity UE C's domain name to be Operator2.com. The IBCF 4 compares the diverting entity domain name Operator2.com to the Operator-2 Network domain name Operator2.com and determines that the diverting entity domain name does match the domain name of the Operator-2 Network.

IBCF 2 114 determines that the SIP INVITE request 6088 is a SIP INVITE request that was previously diverted by the Operator-2 Network 112 as it meets the first matching criteria. When the SIP INVITE request is determined to have been previously diverted by the Operator-2 Network 112, the Operator-2 Network 112 proceeds to process the received SIP INVITE request at the Operator-2 Network 112 as a SIP INVITE request that was previously diverted by the Operator-2 Network.

Processing the received SIP INVITE request 6088 at the Operator-2 Network 112 as a SIP INVITE request that was previously diverted by the Operator-2 Network includes one or more steps 6092, 6093, 6094 6096, 6100, 6102, 6104, 6106, 6110, 6112, 6114, 6116. Operation proceeds from step 6092 to step 6093.

In step 6093, IBCF 4 120 marks each existing history-info header that already has a corresponding identity(div) header which has been successfully verified. In this example the History-Info header "History-Info: 5617001001@Operator2.com" is marked by modifying it to become "History-Info: 5617001001@Operator2.com: already-has-div". The IBCF 4 120 also marks each existing diversion header that already has a corresponding identity (div) header which has been successfully verified. In this example the Diversion header "Diversion: 5617001001@Operator2.com" is marked by modifying it to become "Diversion: 5617001001@Operator2.com: already-has-div". In some embodiments, the only the history-info header or the diversion header is used (the default being the history-info header) and the other header is ignored. While the marking is shown as text added as "already-has-div" to the header information, this should be understood as only an exemplary marking and other marking techniques, text, numbers, etc. may be used. Operation proceeds from step 6093 to step 6094.

In step 6094, the IBCF-4 120 generates SIP INVITE request 6098 based on SIP INVITE request 6088 and the modified SIP history-info and/or SIP diversion headers. Generating SIP INVITE request 6088 includes updating the SIP INVITE request to include a verstat parameter that reflects the verification results of the verification process performed on the "shaken" and "div" identities. In this example, the verstat parameter is a tel URI parameter included within the P-Asserted-Identity (PAI) header which includes information indicating that the "shaken" and "div" identities where successfully verified. Alternatively, the verstat parameter may be included in the From header information. In generating the SIP INVITE request 6098, IBCF 4 120 includes the identity headers which were verified so that it can transparently pass them to the IMS core 2 116. The IBCF 4 120 also includes the modified SIP history-info and modified SIP diversion headers which include the Operator-2 Network domain name and unmodified History-Info headers with domain names that are different from the Operator-2 Network which in this case include the History-Info headers with the Operator-1.com domain name and the two History-Info headers with the Operator-3.com domain name. Operation proceeds from step 6094 to step 6096.

In step 6096, IBCF 4 120 transmits the generated SIP INVITE request 6098 to IMS Core 2 116 for additional processing therein transparently passing the Identity headers which have been verified without modification to the IMS Core 2 116 but including the modified History-Info and Diversion headers.

In step 6100, the IMS Core 2 116, e.g., IMS Core 2 network equipment, receives the SIP INVITE request 6098. Operation proceeds from step 6100 to step 6102.

In step 6102, the IMS Core 2, 116, e.g., IMS Core 2 network equipment, performs further processing of the received SIP INVITE request 6098. The IMS core 2 116 determines based on information in the SIP INVITE request message 6098 that the terminating subscriber of the SIP INVITE request 6098 is UE E (5617001002) based on the sip address 5617001002@Operator2.com including the request line of the SIP INVITE request 6098. The IMS core 2 116 further determines based on the domain of SIP address which is Operator2.com that the address belongs to and/or is assigned to the Operator-2 Network 112. The IMS core 2 116 further determines that call forwarding has been enabled for this SIP address and/or terminating subscriber UE E (5617001002) to another subscriber UE F (56189001001) who belongs to and/or is assigned to Operator-4 Network 140. Operation proceeds from step 6102 to step 6104.

In step 6104, the IMS Core 2 116 generates SIP INVITE request 6108 based on SIP INVITE request 6098. Generating SIP INVITE request 6108 includes generating a new request line which includes the SIP address of the UE F (5619001001) to which the call (i.e., SIP INVITE request) is being diverted or forwarded—"INVITE sip: 5619001001@Operator4.com", new History-Info headers— "History-Info: 5617001002@Operator2.com" and "History-Info: 5617001002@192.168.0.1". The verstat parameter is also removed. In this example, 192.168.0.1 is an Internet Protocol address assigned to or belonging to the Operator-2 Network. The added History-Info header with the IP address is therefore duplicative of added History-Info header with the Operator2.com domain name. In this example, the IMS core 2 network equipment also generates a History-Info: imscore.Operator2.com header. Operation proceeds from step 6104 to step 6106.

In step 6106, the IMS Core 2 116 transmits the generated SIP INVITE request 6108 to IBCF 5 122 located at the edge, i.e., exit point, of the Operator-2 Network 112. IBCF 5 122 is coupled to Operator-4 Network 140 to which the SIP INVITE request/call initiation request is being forwarded. Operation proceeds from step 6106 to step 6110.

In step 6110, IBCF 5 122 receives the SIP INVITE request 6108 from the IMS Core 2 116. Operation proceeds from step 6110 to step 6112.

In step 6112, the IBCF 5 122 processes the received SIP INVITE request 6108. As signing is efficient if performed at the network boundaries, the IBCF 5 133 performs shaken/stir signings for the call/call diversions for which Operator-2, e.g., the devices within the Operator-2 Network 112, are responsible. In this example, since IBCF 1 108 of the Operator-1 Network 102 has already performed "shaken" signing, the IBCF 5 122 performs only Identity "div" signing for the diversions occurring at the Operator-2 Network 112 and uses the "shaken" and "div" Identity headers received from the IBCF 1 108 as is. These "shaken" and "div" headers had been verified at the entry to the Operator-2 network by IBCF 4 120. As part of processing the received SIP INVITE request 6108, in some embodiments the IBCF 5 122 determines if the call/SIP INVITE request 6108 has been diverted by entities or devices within the Operator-2 Network 112, e.g., by IMS Core 2 116 equipment. The determination is made based on History-Info header information or Diversion header information. As previously discussed if both History-Info and Diversion headers are present in the received SIP INVITE request then only one of the two headers (History-Info header or Diversion header) is used for signing. Which of the History-Info header or the Diversion header will be used for signing may be, and in some embodiments is, configurable. The default configuration being that History-Info headers are used for signing when both History-Info and Diversion headers are present. In this case, the determination is that a diversion was made by the Operator-2 Network 112 based on the History-Info: 5617001001@Operator2.com: already-has-div; History-Info: imscore.Operator2.com; History-Info: 5617001002@Operator2.com header information and the History-Info: 5617001002@192.168.0.1.

Prior to generating any identity div headers for diversions that occurred at the Operator-2 Network, the IBCF 5 122 identifies any History-Info headers or Diversion headers with the Operator-2 domain name or IP address that already have an Identity div header and refrains from generating a new Identity div header for the identified History-Info header for which an Identity div header already exists. The IBCF 5 makes this determination based on whether any of the History-Info headers include a marking indicating that the SIP INVITE request already includes an Identity div header for the History-Info header. In this example, the IBCF 5 identifies that the "History-Info: 5617001001@Operator2.com; already-has-div" header is marked as already-has-div and refrains from signing this History-Info header or using this History-Info header information to generate an identity div header as one already exists for this History-Info header, i.e., Identity: <ppt=div> (C→D) header already exists. If the IBCF 5 122 was using Diversion headers instead of History-Info headers for generating Identity div headers it would similarly identify Diversion: 5617001001@Operator2.com; already-has-div as a Diversion header that is marked as already having an existing Identity div header to which it corresponds and therefore would refrain from generating and signing an Identity div header for this Diversion header as it would be duplicative of the Identity: <ppt-div>(C→D) header.

Also prior to generating any identity div headers for diversions that occurred at the Operator-2 Network, the IBCF 5 identifies any History-Info headers with the Operator-2 domain name or IP address that do not have a valid user part and refrains from signing such History-Info headers. In this example, the IBCF 5 identifies that the History-Info: imscore.Operator2.com does not include a valid user part and refrains from signing this History-Info header or using this History-Info header information to generate an identity div header.

Also prior to generating any identity div headers for diversions that occurred at the Operator-2 Network, the IBCF 5 122 identifies any History-Info headers that are duplicative, e.g., the userpart is the same but the hostpart is different) and refrains from signing these identified History-Info headers. In this example, the IBCF 5 identifies that the History-Info: 5617001002@192.168.0.1 is duplicative of the History-Info: 5617001002@Operator2.com and refrains from signing the History-Info header 5617001002@192.168.0.1 or using this History-header information to generate an identity div header.

In this example, IBCF 5 122 determines that the "History-Info header 5617001002@Operator2.com" is not duplicative and is not marked as already having a corresponding Identity div header. IBCF 5 122 based on this determination generates an Identity div header based on the History-Info header or by signing this History-Info header for "History-Info header 5617001002@Operator2.com".

The "Identity: <ppt=div>(E→F)" Identity diversion header is generated as part of step 6112 based on History-Info: History-Info: 5617001002@Operator2.com information.

IBCF 5 122 also refrains from generating any Identity Div headers for diversions which did not occur at the Operator-2 network. This includes not signing or generating an Identity div header for the "History-Info: 5618001001@Operator3.com" even though this will create a break in the Identity div header chain. This break in the chain for no Identity div for the D→E diversion will result in subsequent nodes that perform verification to have the verification fail and they will be able to trace back the failure to the Operator 3 network and determine that it is a misbehaving or non-compliant Operator network. Operation proceeds from step 6112 to step 6114.

In step 6114, IBCF 5 122 generates SIP INVITE request 6118 based on SIP INVITE request 6108 and the newly generated SIP Identity div header Identity. SIP INVITE request 6118 includes the Identity: <ppt=div>(E→F) identity diversion header generated in step 6112. In some embodiments, step 6114 includes the generation of the Identity: <ppt=div>(E→F) identity diversion header instead of step 6112. The markings indicating that certain History-Info and Diversions headers already have corresponding Identity div headers is removed from the History-Info and Diversion headers. In this example, the "History-Info: 5617001001@Operator2.com; already-has-div" header is modified to be "History-Info: 5617001001@Operator2.com" and the "Diversion: 5617001001@Operator2.com: already-has-div" header is modified to be "Diversion: 5617001001@Operator2.com". Operation proceeds from step 6114 to step 6116.

Figure 6E:
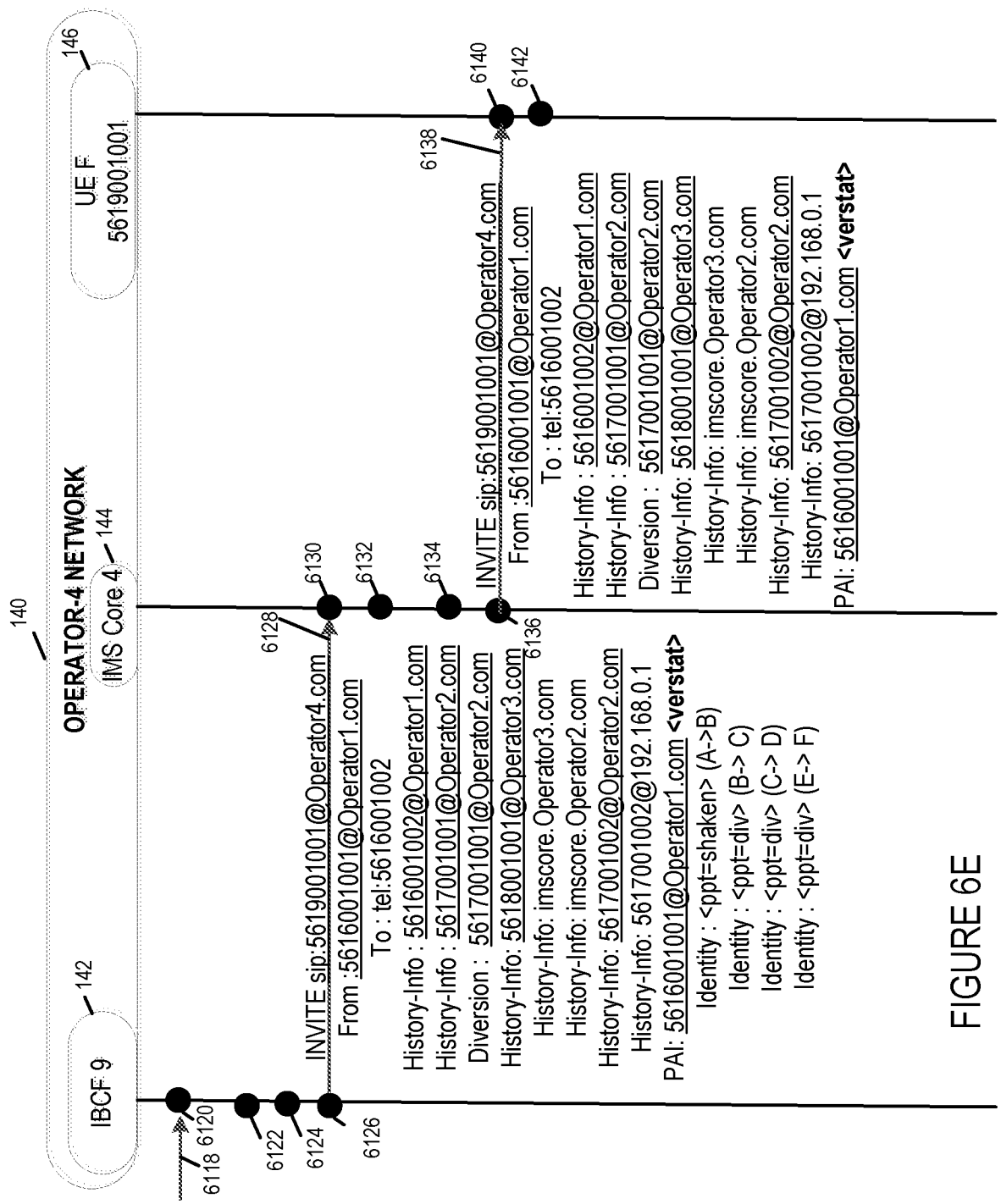
FIG. 6E illustrates a fifth part of exemplary signaling flow diagram with accompanying methods steps of an exemplary method in accordance with an embodiment of the present invention.

In step 6116, the IBCF 5 122 transmits from the Operator-2 Network 112 the SIP INVITE request message 6118 to IBCF 9 142 located at the Operator-4 Network 140 shown on FIG. 6E. Operation proceeds from step 6116 to step 6120.

In step 6120, the IBCF 9 142 at the Operator-4 Network 140 receives the SIP INVITE request 6118. Operation proceeds from step 6120 to step 6122.

At step 6122, IBCF 9 142 processes the received SIP INVITE request 6118. Processing the SIP INVITE request 6118 includes verifying the "shaken" and "div" identity. In this example, the "div" verification will fail because there is a break in the "div" Identity chain as there is no "div" Identity header for the diversion from UE D to UE E. IBCF 9 142 generates a <verstat> indicating the failure of the verification. Operation proceeds from step 6122 to step 6124.

In step 6124, the IBCF-9 142 generates SIP INVITE request 6128 based on SIP INVITE request 6118. Generating SIP INVITE request 6142 includes updating the SIP INVITE request to include a verstat parameter that reflects the verification results of the verification process performed on the "shaken" and "div" identities. In this example, the verstat parameter is a tel URI parameter included within the P-Asserted-Identity (PAI) header which includes information indicating the verification of the "shaken" and "div" headers failed. While the "shaken" and "div" identities present in the received SIP INVITE request 6118 can be successfully verified, the overall "shaken" and "div" Identity has a gap in the "div" identity chain for the diversion of the SIP INVITE request from UE D (5618001001) to UE E (5617001002). Alternatively, the verstat parameter may be included in the From header information. In generating the SIP INVITE request 6128, IBCF 9 142 includes the identity headers after verification as it transparently passes them and the History-Info and Diversion headers to the IMS core 4 144. Operation proceeds from step 6124 to step 6126.

In step 6126, the IBCF 9 142 transmits the SIP INVITE request 6128 to the IMS Core 4 144 for additional processing. Operation proceeds from step 6126 to step 6130.

In step 6130, the IMS core 4 144 receives the SIP INVITE request 6128 from the IBCF 9 142. Operation proceeds from step 6130 to step 6132.

In step 6132, the IMS core 4 144 processes the SIP INVITE request 6128 which includes determining from the <verstat> result that the "shaken" and "identity" headers failed verification. The IMS core 4 144 determines from the SIP INVITE request line that the destination or target of the SIP INVITE is UE F (5619001001) which is located within or belongs to Operator-4 Network 140. The IMS core 4 144 further determines that the SIP INVITE request may be terminated at the UE F (5619001001) as it does not have call forwarding enabled and is available for receiving SIP requests. Operation proceeds from step 6132 to step 6134.

In step 6134, the IMS Core 4 144 generates SIP INVITE request 6138 based on received SIP INVITE request 6128. Generating SIP INVITE request 6138 includes removing the Identity shaken and div headers but leaving the <verstat> parameter indicating that verification of the Identity shaken and div headers had failed, i.e., not been successful. The <verstat> parameter is included in the SIP INVITE request 6138 message as the SIP INVITE request 6138 is to be sent to the subscriber. Operation proceeds from step 6134 to step 6136.

In step 6136, the IMS Core 4 144 transmits the SIP INVITE request 6138 to terminating destination UE F (5619001001) where the call is terminated. Operation proceeds from step 6136 to step 6140.

In step 6140, UE F 146 receives the SIP INVITE request 6138. Operation proceeds from step 6140 to step 6142.

In step 6142, the UE F 146 processes the received SIP INVITE request 6138 including generating a response message to the SIP INVITE request 6138. Operation continues from step 6142 for the establishment of the call.

In some embodiments, the Operator-4 Network 140 (e.g., IBC 9 142 or IMS Core 4 144 network equipment) on the failure of the verification process for the Shaken and Div Identity headers may determine the call is robocall and reject the call without terminating at UE F (5619001001).

In some embodiments, in step 6093, instead of marking each existing history-info header and diversion header which meets the first criteria and has a corresponding identity(div) header which has been successfully verified, the IBCF 4 120 deletes each existing history-info header and diversion header which meets the first criteria that already has a corresponding identity(div) header which has been successfully verified. In this embodiment the History-Info header "History-Info: 5617001001@Operator2.com" and the Diversion header "Diversion: 5617001001@Operator2.com" which were marked with the "already-has-div" are deleted instead of marked. As a result, in processing step 6112 there will be no Diversion headers and the only History-Info headers with a domain or IP matching the Operator-2 Network 140 domain or IP address will be: "History-Info: imscore.Operator2.com", "History-Info: 5167001002@Operator2.com", and "History-Info: 5167001002@192.168.0.1". Step 6112 will not include the step of identify the History-Info headers that have been marked and refraining from generating Identity div headers for the marked History-Info headers as no History-Info headers are marked. In step 6112, the IBCF 5 122 will also not generate duplicate headers for the headers with already existing Identity div headers as the History-Info headers will have been deleted in step 6093.

In some embodiments, in step 6092, determining whether or not the received SIP INVITE request 6088 was previously diverted includes determining if any of the History-Info or Diversion headers in the received SIP INVITE request 6088 matches, meets or fulfills the first matching criteria of the Operator-2 Network 112. The first matching criteria being whether the History-Info header or Diversion headers in the received SIP INVITE request 6088 include a domain or IP address matching the domain or IP address of the Operator-2 network 112. This determination is made without the IBCF 4 120 verifying any identity(div) or that the successfully verified identity (div) headers have a corresponding History-Info and/or Diversion header. In such embodiments, the IBCF 4 120 marks and/or deletes all History-Info and Diversion headers present in the received SIP INVITE request 6088 which the IBCF 4 120 identifies as matching, meeting or fulfilling the first matching criteria of the Operator-2 Network 112.

It should be understood that generating a SIP INVITE request based on a received SIP INVITE request may, and in some embodiments, does include, updating or modifying the received SIP INVITE request.

Figure 7A:
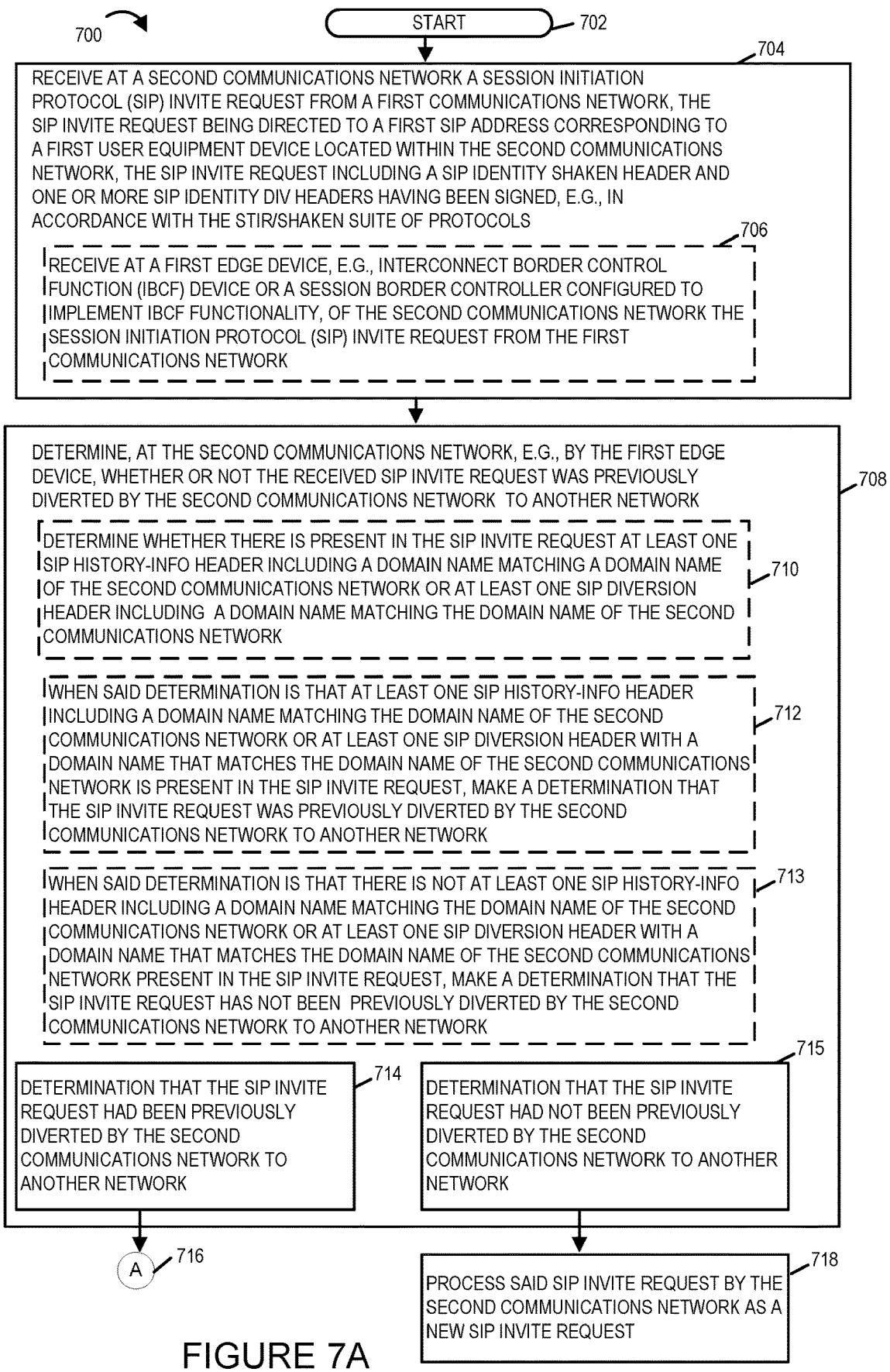
FIG. 7A illustrates a first part of an exemplary method in accordance with an embodiment of the present invention.
Figure 7B:
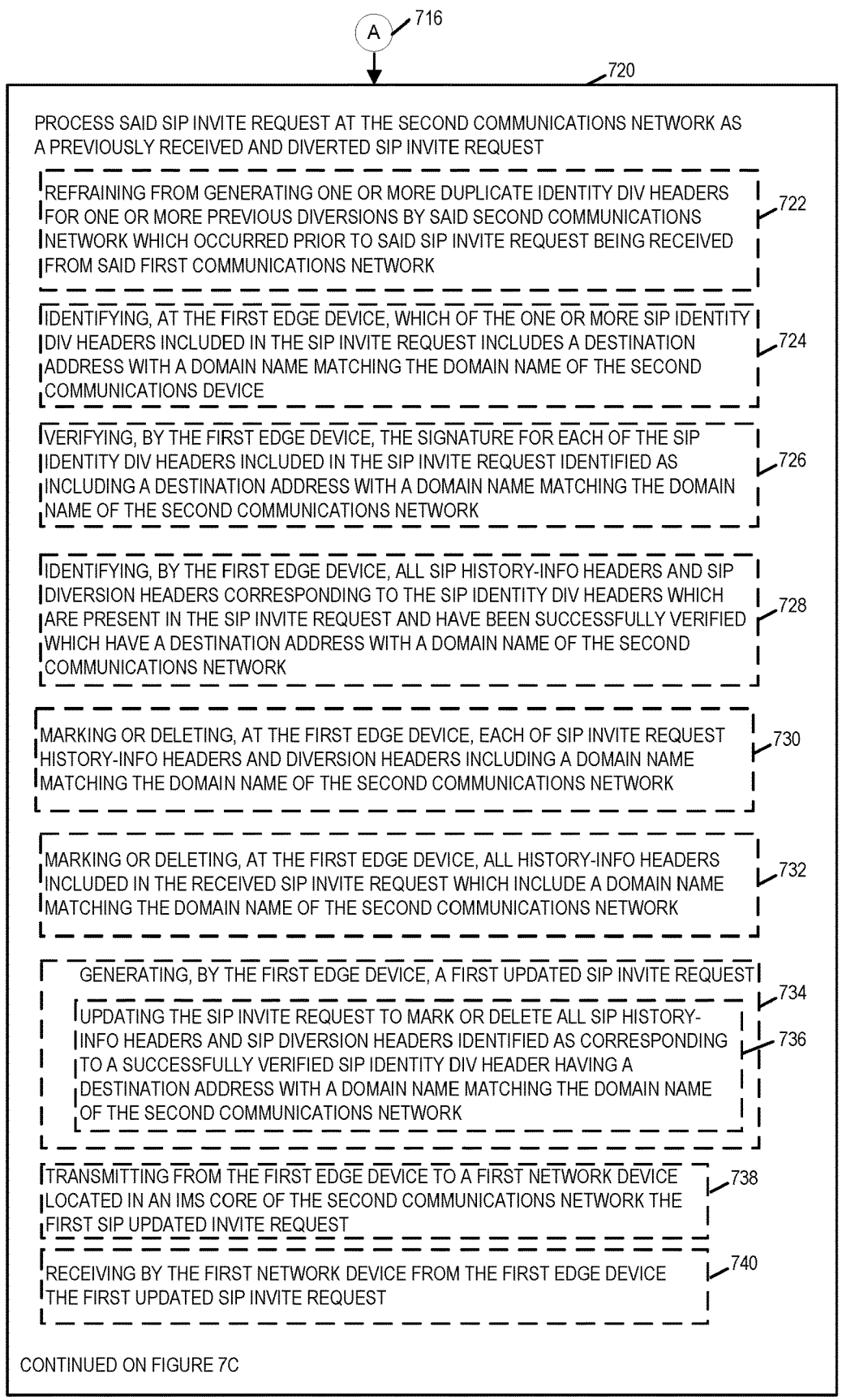
FIG. 7B illustrates a second part of an exemplary method in accordance with an embodiment of the present invention.

FIG. 7 comprises FIG. 7A, FIG. 7B, FIG. 7C and FIG. 7D. FIG. 7A illustrates a first part of a flowchart of an exemplary method 700 which illustrates the steps for a "div" signing procedure in accordance with an embodiment of the present invention. FIG. 7B illustrates a second part of a flowchart of an exemplary method 700 which illustrates the steps for a "div" signing procedure in accordance with an embodiment of the present invention. FIG. 7C illustrates a third part of a flowchart of an exemplary method 700 which illustrates the steps for a "div" signing procedure in accordance with an embodiment of the present invention. FIG. 7D illustrates a fourth part of a flowchart of an exemplary method 700 which illustrates the steps for a "div" signing procedure in accordance with an embodiment of the present invention. The method 700 may be, and in some embodiments is, implemented on system 100 shown in FIG. 1. It should be understood that system 100 is only an exemplary system and that the method 700 is applicable to other systems.

Operation begins in start step 702. Operation proceeds from step 702 to step 704.

In step 704, a Session Initiation Protocol (SIP) Invite Request from a first communications network is received at a second communications network with the SIP Invite Request being directed to a first SIP address corresponding to a first user equipment device located within the second communications network. The SIP Invite Request includes a SIP Identity shaken header and one or more SIP Identity Div headers which have been signed, e.g., in accordance with the STIR/SHAKEN suite of protocols. In some embodiments, step 704 includes sub-step 706. In sub-step 706, the SIP Invite Request is received at a first edge device of the second communications network. In some embodiments, the first edge device is for example an Interconnect Border Control Function (IBCF) device which provides IMS network security or a Session Border Controller configured to implement IBCF Functionality. In some embodiments, the first communications network is a first Internet Protocol (IP) Multimedia Subsystem (IMS) network. In some embodiments, the second communications network is a second Internet Protocol Multimedia Subsystem network. In some embodiments, the first communications network and the second communications network are operated by the different service providers. In most embodiments, the first edge device is located at a boundary between the first communications network and the second communications network. Operation proceeds from step 704 to step 708.

In step 708, a determination is made at the second communications network, e.g., by the first edge device, as to whether or not the received SIP Invite Request was previously diverted by the second communications network to another network. In some embodiments the another network is an IMS network. In some embodiments, the another communications network is operated by a different service provider than the second communications network and/or the first communications network. In some embodiments, step 708 includes one or more sub-steps 710, 712, 713, 714 and 715.

In sub-step 710, a determination is made, e.g., by the first edge device, as to whether or not there is present in the received SIP Invite Request at least one SIP History-Info header including a domain name matching a domain name of the second communications network or at least one SIP Diversion header including a domain name matching the domain name of the second communications network.

In sub-step 712, when the determination is that at least one SIP History-Info header including a domain name matching the domain name of the second communications network or at least one SIP Diversion header with a domain name that matches the domain name of the second communications network is present in the received SIP Invite Request, a determination is made, e.g., by the first edge device, that the SIP Invite Request was previously diverted by the second communications network to another network. Operation proceeds from sub-step 712 to sub-step 714.

In sub-step 713, when the determination is that there is not at least one SIP History-Info header including a domain name matching the domain name of the second communications network or at least one SIP Diversion header with a domain name that matches the domain name of the second communications network present in the received SIP Invite Request, a determination is made, e.g., by the first edge device, that the received SIP Invite Request has not been previously diverted by the second communications network to another network. Operation proceeds from sub-step 713 to sub-step 715.

In sub-step 715, when the determination is that the received SIP Invite Request had not been previously diverted by the second communications network to another network operation proceeds from step 708 sub-step 715 to step 718. In step 718, the received SIP Invite Request is processed by the second communications network as a new SIP Invite Request (i.e., as a SIP Invite Request that has not previously been diverted or forwarded from the second communications network in prior processing).

In sub-step 714, when the determination is that the received SIP Invite Request had been previously diverted by the second communications network to another network, e.g., by a device within the second communications network, operation proceeds from step 708 sub-step 714 via connection node A 716 to step 720. Step 720 is shown on FIGS. 7B, 7C and 7D.

In step 720, the received SIP Invite Request, is processed at the second communications network as a previously received and diverted SIP Invite Request. In some embodiments, step 720 includes one or more sub-steps 722, 724, 726, 728, 730, 732, 734, 738, 740, 744, 746, 754, 756, 766, 768, 770, 780 and 782.

In sub-step 722, processing the received SIP Invite Request at the second communications network as a previously received and diverted SIP Invite Request includes refraining from generating one or more duplicate SIP Identity Div headers for one or more previous diversions by said second communications network which occurred prior to said SIP Invite Request being received from the first communications network.

In sub-step 724, the first edge device identifies which of the one or more SIP Identity Div headers included in the SIP Invite Request includes a destination address with a domain name matching the domain name of the second communications device.

In sub-step 726, the first edge device verifies the signature for each of the SIP Identity Div headers included in the SIP Invite Request identified as including a destination address with a domain name matching the domain name of the second communications network.

In sub-step 728, the first edge device identifies all SIP History-Info headers and SIP diversion headers corresponding to the SIP Identity Div headers which are present in the SIP Invite Request and have been successfully verified which have a destination address with a domain name of the second communications network.

In sub-step 730, the first edge device marks or deletes each of the SIP Invite Request History-Info headers and SIP Diversion headers including a domain name matching the domain name of the second communications network.

In sub-step 732, the first edge device marks or deletes all History-Info headers in the received SIP Invite Request which include a domain name matching the domain name of the second communications network. This sub-step is typically used when the second communications network is configured to only operate using SIP History-Info headers and not SIP Diversion headers.

In sub-step 734, the first edge device generates a first updated SIP Invite Request. In some embodiments sub-step 734 includes sub-step 736. Sub-step 736 includes updating the received SIP Invite request to mark or delete all SIP History-Info Headers and SIP Diversion Headers identified as corresponding to a successfully verified SIP Identity DIV header having a destination address with a domain name matching the domain name of the second communications network. In some embodiments, sub-step 730 or sub-step 732 is used instead of sub-step 736 as part of generating the first updated SIP Invite Request.

In sub-step 738, the first edge device transmits the first updated SIP Invite Request from the first edge device to a first network device located in second communications network. In some embodiments, the first network device is located in or part of an IMS core of the second communications network.

In sub-step 740, the first network device receives the first updated SIP Invite request from the first edge device.

In sub-step 744 shown on FIG. 7C, the first network device determines that the first updated SIP Invite Request directed to the first SIP address is to be diverted or forwarded to a second SIP address corresponding to a second user equipment device, the second SIP address including a domain name of a communications network different than the second communications network, e.g., a domain name of a third communications network. In some embodiments, the third communications network is an IMS network operated by a service provider different than the second communications network. In some embodiments, the domain name may be for the first communications network from which the SIP Invite Request was received.

In sub-step 746, when the first network device determines in sub-step 744 that the first updated SIP Invite Request is to be diverted or forwarded to the second SIP address including a domain name of a communications network different than the second communications network, e.g., the domain name of a third communications network, the first network device performs one or more of the operation in the sub-steps 748 and 750. In sub-step 748, the first network device generates a SIP History-Info header including the first SIP address, the first SIP address including the domain name for the second communications network. In sub-step 750, the first network device generates a second updated SIP Invite Request by updating the first updated SIP Invite Request. Updating the first updated SIP Invite Request includes: (i) updating the Request Line of the first updated SIP INVITE Request to include the Second SIP address, and (ii) adding the generated SIP History-Info header including the first SIP address.

In sub-step 754, the first network device determines that the first updated SIP Invite Request directed to the first SIP address is to be diverted to or forwarded to a second SIP address corresponding to a second user equipment, the second SIP address including a domain name matching the domain name of the second communications network and SIP Invite Requests to the second SIP address are being diverted or forwarded to a third SIP address corresponding to a third user equipment device. The first network device further determining that the third SIP address includes a domain name of a communications network different than said second communications network, e.g., a domain name of a fourth communications network or the domain name of the third communications network. In this sub-step the first network device has determined that the there are two diversions at the second communications network. The first diversion is from the first SIP address to the second SIP address, the second SIP address being an address located within the second communications network and for which SIP Invite Request or calls are being diverted or forwarded to a third SIP address. The second diversion at the second communications network is from the second SIP address to the third SIP address. The third SIP address includes a domain name for a domain which is different from the second communications network so the SIP Invite is to be diverted or forwarded to a different network.

In sub-step 756, when the first network device determines in sub-step 754 that the first updated SIP Invite Request is to be diverted or forwarded to the third SIP address including a domain different than the domain name of the second communications network, e.g., the domain name of a fourth communications network or the domain name of the third communications network, the first network device performs one or more of the operations in the sub-steps 758, 760, and 762. In sub-step 758, the first network equipment device generates a SIP History-Info header including the first SIP address, the first SIP address including the domain name for the second communications network. In sub-step 760, the first network equipment device generates a SIP History-Info header including the second SIP address, the second SIP address including the domain name for the second communications network. In sub-step 762, the first network equipment device generates a second updated SIP Invite Request by updating the first updated first SIP Invite Request. Updating the first updated SIP Invite Request including: (i) updating the Request Line of the updated SIP Invite Request to include the third SIP address; (ii) adding the generated SIP History-Info header including the first SIP address; (iii) adding the generated SIP History-Info header including the second SIP address.

In sub-step 766, the first network device transmits from the first network device to a second edge device of the second communications network the second updated request. In some embodiments, the second edge device is for example an Interconnect Border Control Function (IBCF) device which provides IMS network security or a Session Border Controller configured to implement IBCF Functionality. In most embodiments, the second edge device is located at a boundary between the first communications network and the communications network to which the second updated SIP INVITE request is being diverted, e.g., the third communications network or a fourth communications network.

In sub-step 768, the second edge device receives the second updated SIP Invite Request from the first network device of the second communications network.

In sub-step 770, the second edge device generates a third updated SIP Invite Request based on the second updated SIP Invite Request. Sub-step 770 in some embodiments includes sub-steps 772. In sub-step 772, the second edge device generates the third updated SIP Invite Request by performing one or more of the following operations: (i) identifying all SIP History-Info headers including the domain name of the second communications network; (ii) identifying which of the identified SIP History-Info headers including the domain name of the second communications network have been marked; (iii) refraining from generating SIP Identity Diversion Headers for the identified marked SIP History-Info headers; and (iv) generating at least one SIP Identity Diversion header for a History-Info header that includes the domain name of the second communications network and that meets one or more conditions. In some embodiments sub-step 772 includes one or more sub-steps 774, 776, and 778.

In sub-step 774, the operation of generating at least one SIP Identity Diversion Header for a History-Info header that includes the domain name of the second communications network and meets the one or more conditions includes generating a SIP Identity Diversion header for each SIP History-Info header that includes the domain name of the second communications network and meets the one or more conditions. The one or more conditions including at least the condition that the SIP History-Info header is not marked. In some embodiments, the one or more conditions further include the conditions that the History-Info header has a valid user information part. In some embodiments, the one or more conditions is that the SIP History-Info header is not a duplicative SIP History-Info header. A SIP History-Info header is duplicative of another SIP History-Info header when it has the same userpart but a different hostpart.

In sub-step 776, the operation of generating at least one SIP Identity Diversion header for a SIP History-Info header that includes the domain name of the second communications network includes generating a single SIP Identity Diversion header for the SIP History-Info header including the first SIP address when the second SIP address includes the domain name of a communications network different than the second communications network, e.g., the domain name of a third communications network.

In sub-step 778, when the first SIP address and the second SIP address both include a domain name matching the second communications network domain name, the operation of generating at least one SIP Identity Diversion header for a SIP History-Info Header that includes the domain name of the second communications network includes either generating a single SIP Identity Diversion header for both the SIP History-Info header including the first SIP address and the SIP History-Info header including the second SIP address or generating separate SIP Identity Diversion headers for the SIP History-Info header including the first SIP address and the SIP History-Info header including the second SIP address. In some such embodiments, when a single Identity Diversion header is generated the single Identity Diversion header includes an origin address, a destination address and a diversion address, the destination address including the address of the first SIP address and the diversion address including the third SIP address in the example that the third SIP address is the address to which the third updated SIP Invite Request is being diverted.

In some embodiments, prior to generating at least one SIP Identity diversion header for History-Info headers that include the domain name of the second communications network and meet the one or more conditions, deleting those SIP History-Info headers that do not have an address with a valid user information part.

In sub-step 780, the second edge device removes the markings from the SIP History-Info headers and SIP Diversion headers made by the first edge device.

In sub-step 782, the second edge device of the second communications network transmits the third updated SIP Invite Request to the communications network with the domain name included in the SIP request line of the third updated SIP Invite Request. This is the communications network to which the SIP Invite Request received at the second communications network is being diverted or forwarded, e.g., the third communications network or the fourth communications network. In the example where the SIP Invite Request is being diverted or forwarded to the second SIP address which has a domain name of the third communications network the third updated SIP Invite Request is transmitted to the third communications network. In the example where the SIP Invite Request is being diverted or forwarded to the third SIP address which has a domain name of the fourth communications network the third updated SIP Invite Request is transmitted to the fourth communications network, e.g., to an IBCF device located in the fourth communications network.

In various embodiments, one or more of the following are virtual devices implemented on a compute node in a cloud system: the first edge device, the second edge device, and the first network device. In some such embodiments, each device is implemented on a different compute node. In some embodiments, the compute node includes a processor which is coupled to memory. In some embodiments, the compute node includes a processor and memory. In some embodiments, the cloud system is a public cloud system. In some embodiments, the cloud system is a private cloud system.

In various embodiments, SIP Identity div header(s) included in the SIP Invite Request received at the second communications network each include an origin address, a destination address, and a diversion address, the origin address being an address form which the SIP Invite Request originated, said destination address being an address to which the SIP Invite request was targeted, said diversion address being an address to which the SIP Invite Request was diverted. Similarly, SIP Identity div header generated by the second edge device include an origin address, a destination address, and a diversion address, the origin address being an address form which the SIP Invite Request originated, said destination address being an address to which the SIP Invite request was targeted, said diversion address being an address to which the SIP Invite Request is being diverted.

Figure 4:
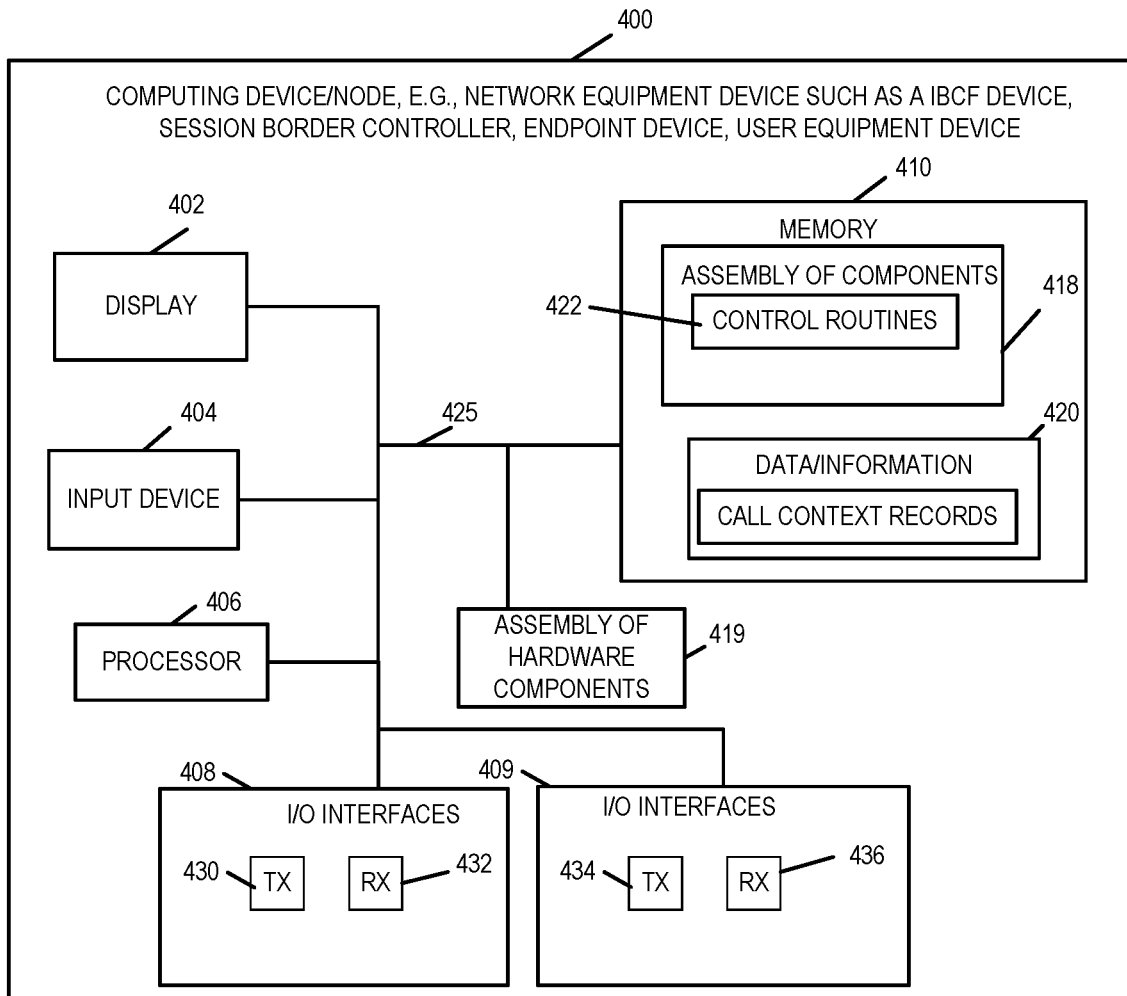
FIG. 4 illustrates an exemplary computing in accordance with an embodiment of the present invention.

FIG. 4 illustrates a computing device in accordance with an embodiment of the invention. FIG. 4 illustrates an exemplary computing device, e.g., a user equipment device, e.g., a fixed or mobile phone, computer, smartphone, IP phone, or table, a network equipment device such as for example, an IBCF device, a Session Border Controller, a Centralized Policy and Routing Server (PSX), an IMS Border Gateway Control Function (BGCF) device, and a gateway, in accordance with an embodiment of the present invention.

Exemplary computing device/node 400 includes an optional display 402, an input device 404, a processor 406, e.g., a CPU, I/O interfaces 408 and 409, which couple the computing device/node 400 to networks or communications links and/or various other nodes/devices, memory 410, and an assembly of hardware components 419, e.g., circuits corresponding to different components and/or modules, coupled together via a bus 425 over which the various elements may interchange data and information. Memory 410 includes an assembly of components 418, e.g., an assembly of software components, and data/information 420. The assembly of software components 418 includes a control routines component 422 which includes software instructions which when processed and executed by processor 406 control the operation of the computing device/node 400 to perform various functions and/or one or more steps of the various method embodiments of the invention. The I/O interface 408 includes transmitters 430 and receivers 432. The I/O interface 409 includes transmitters 434 and receivers 436. The I/O interfaces are hardware interfaces including hardware circuitry. The computing device/node 400 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Session Initiation Protocol (SIP), Session Description Protocol (SDP), Internet Protocol (IP), Transport Control Protocol (TCP), User Datagram Protocol (UDP), SQL (Structured Query Language being used to interface and access information from the various databases and/or storage devices to which it may be coupled. In some embodiments, the computing device/node 400 includes a communication component configured to operate using SIP, SDP, IP, TCP, UDP, REST protocol, SQL (Structured Query Language), HDFS Hadoop Distributed File System. In some embodiments, the communications component is a hardware component, a software component or a component including hardware and software components. While only a single hardware processor is illustrated in some embodiments, it is to be understood that the computing device/node 400 can include more than one processor with the processing being distributed among the plurality of processors. In some embodiments, one or more of the network equipment devices, user equipment devices, IBCF devices illustrated or referenced in connection with FIG. 1, e.g., Operator-2 Network 112 devices, are implemented in accordance with the computing device/node 400 illustrated in FIG. 4 including for example: UE C 126, UE E 128, IBCF 2 114, IBCF 3 118, IBCF 4 120, IBCF 5 122, . . . , IBCF M 124, IMS core 2 network devices 116.

The present invention is applicable to and may be implemented in network equipment which provide STIR/SHAKEN capabilities, e.g., IBCF devices, Session Border Controllers, Centralized Policy and Routing Server (PSX), IMS Border Gateway Control Function (BGCF) devices, and gateways.

Figure 5:
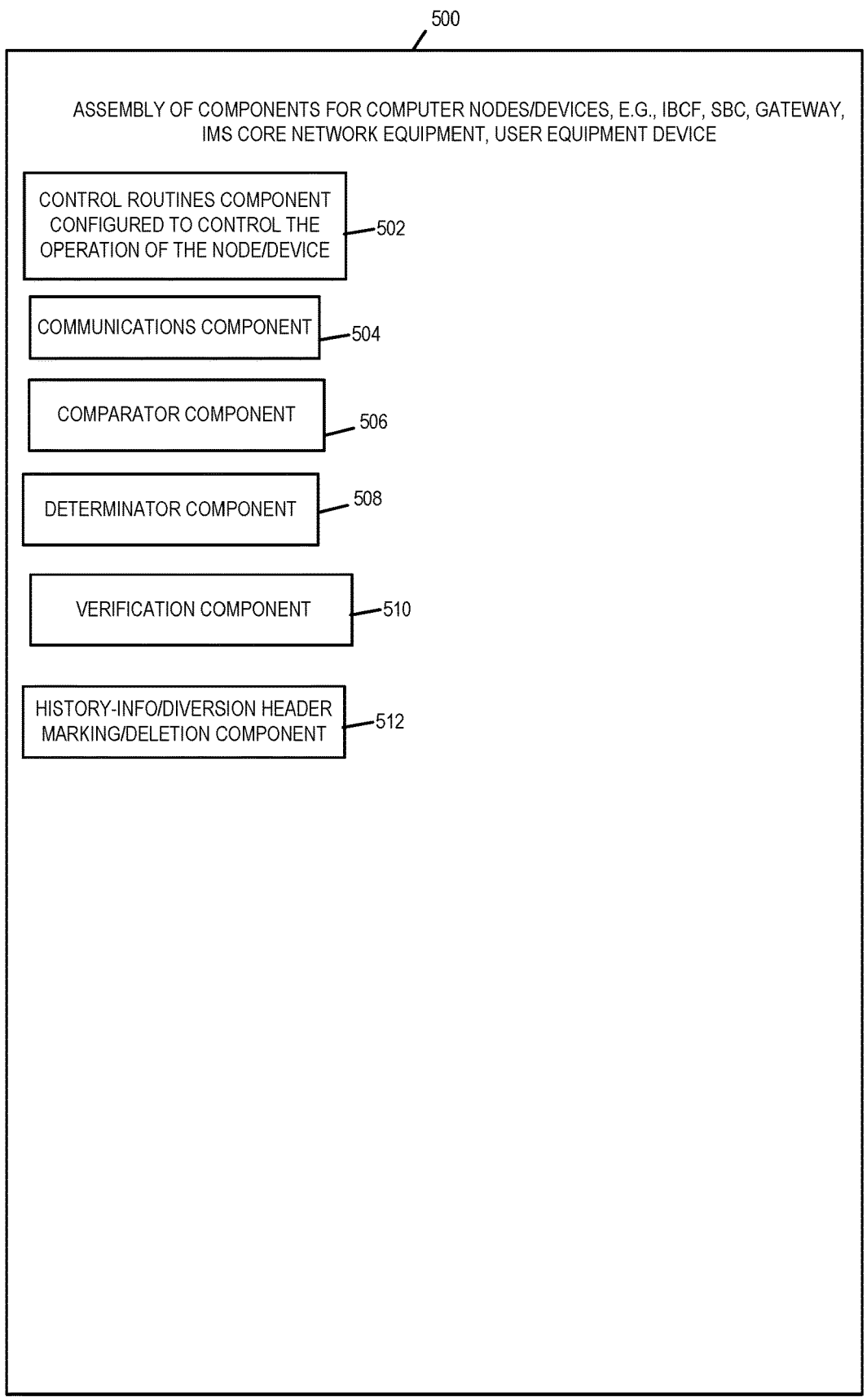
FIG. 5 illustrates an exemplary assembly of components in accordance with an embodiment of the present invention.

An exemplary assembly of components 500 for a computing device/node, e.g., IBCF, SBC, Gateway, IMS Core network equipment, PSX, user equipment device implemented as a node or device in accordance with an embodiment of the present invention is illustrated in FIG. 5. In some embodiments, the assembly of components 500 is for a computing node/device 400. One or more of the assembly of components 500 may be implemented as hardware components in the assembly of hardware components 419 or as software components in the assembly of software components 418 stored in memory 410 of the exemplary computing device/node 400. The assembly of components 500 will now be discussed in further detail below.

FIG. 5 as discussed above is a drawing illustrating an assembly of components 500 which may be included in an exemplary computing device/node 400 of FIG. 1 implemented in accordance with exemplary embodiment computing device/node 400. Assembly of components 500 may be, and in some embodiments is, used in computing device/node 400. The components in the assembly of components 500 can, and in some embodiments are, implemented fully in hardware within the processor 406, e.g., as individual circuits. The components in the assembly of components 500 can, and in some embodiments are, implemented fully in hardware within the assembly of components 419, e.g., as individual circuits corresponding to the different components. In other embodiments some of the components are implemented, e.g., as circuits, within the processor 406 with other components being implemented, e.g., as circuits within assembly of components 419, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 410 of the computing device/node 400, with the components controlling operation of computing device/node 400 to implement the functions corresponding to the components when the components are executed by a processor, e.g., processor 406. In some such embodiments, the assembly of components 500 is included in the memory 410 as assembly of components 418. In still other embodiments, various components in assembly of components 500 are implemented as a combination of hardware and software, e.g., with another circuit external to the processor providing input to the processor 406 which then under software control operates to perform a portion of a component's function. While shown in the FIG. 4 embodiment as a single processor, e.g., computer, it should be appreciated that the processor 406 may be implemented as one or more processors, e.g., computers.

When implemented in software the components include code, which when executed by the processor 406, configure the processor 406 to implement the function corresponding to the component. In embodiments where the assembly of components 500 is stored in the memory 410, the memory 410 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 5 control and/or configure the computing device/node 400 or elements therein such as the processor 406, to perform the functions of corresponding steps illustrated and/or described in the methods of flowchart of FIG. 2 and FIG. 6 and/or described with respect to any of the Figures. Thus the assembly of components 500 includes various components that perform functions of corresponding steps of FIGS. 2, 6 and 7.

Assembly of components 500 includes components 502, 504, 506, 508, 510, and 512. The control routines component 502 is configured to control the operation of the node or device. The communications component 504 is configured to provide communications functionality including communications signaling and support for various communications protocols and interfaces including SIP protocol support and the Shaken/Stir Protocol procedures. The communications component 504 handles all communications functionality including the generation, modification, updating, transmission, and reception of SIP messages, e.g., SIP INVITE request messages. The comparator component 506 compares values including SIP messages and/or portions of SIP messages such as SIP address information, e.g., domain information, to matching criteria. The determinator component 508 makes determinations for the computing device/node such as for example whether or not to process a received SIP INVITE request as a request that has been previously diverted by the network to which the computing device/node belongs or is included or a new request, i.e., that is a request that has not been diverted by the network to which the computing device/node belongs or is included. The verification component 510 verifies Identity "shaken" and "stir" headers. In some embodiments, the verification component 510 is a sub-component of the communications component 504. The History-Info/Diversion header marking/deletion component 512 marks and/or deletes History-Info headers and/or Diversion headers which meet a matching criteria indicating that History-Info header and/or Diversion header is part of a SIP INVITE request that was previously diverted or forwarded by the current network, e.g., Operator Network. In some embodiments the History-Info/Diversion Header marking/deletion component is a sub-component of the communications component 504.

Various advantages of the various embodiments of the present invention will now be discussed. The present invention provides a robust/not error-prone mechanism to add identity(div) headers and optimizes signing capabilities for a diverting carrier or network operator. The invention makes it possible to move signing requirements from every diverting platform or device on to a single platform or device, e.g., an IBCF device at the exit boundary of an operator's network. Another advantage of the invention is that it reduces implementation time and the number of platforms and/or devices that must be upgraded. A further advantage of the invention is that it removes the ambiguity between history-info vs. diversion headers as there is no reliable way to include both. The present invention also prevents spoofing so that the current operator is not tricked into signing for a diversion in someone else's network. Various embodiments of the invention also optimize the number of Identity Headers by unambiguously identifying which headers truly represent a diversion in the diverting operator's network. The invention also prevents generating multiple Identity(div) for the same diversion in the operator's network for scenarios involving multiple diversions/multiple operators. Moreover, the invention provides operators a way to minimize computing intensive operations related to signing (adding Identity header) so that signing (adding Identity header) may be performed only at the egress point to other operators, i.e., networks belonging to a different operator or carrier, even for calls which are diverted multiple times across operator boundaries.

LIST OF NUMBERED EXEMPLARY METHOD EMBODIMENTS

Method Embodiment 1. A communications method comprising: receiving at a second communications network a Session Initiation Protocol (SIP) Invite request from a first communications network, said SIP Invite request being directed to a first SIP address (e.g., sip:5617001002@operator2) corresponding to a first user equipment device located within the second communications network, said SIP Invite request including a SIP Identity shaken header and one or more SIP Identity div headers, said SIP Identity shaken header and said one or more SIP Identity div headers having been signed (i.e., encrypted in accordance with the STIR/SHAKEN suite of protocols); determining at the second communications network whether or not the received SIP Invite request was previously diverted by said second communications network to another network; and when said SIP Invite request is determined to have been previously diverted by said second communications network to another network, processing said SIP Invite request at the second communications network as a previously received and diverted SIP Invite request.

Method Embodiment 1A. The communications method of method embodiment 1 further comprising: when said SIP Invite request is determined to not have been previously diverted by said second communications network to another network, processing the SIP Invite request at the second communications network as a new SIP Invite request.

Method Embodiment 1B. The communications method of method embodiment 1, wherein said receiving at the second communications network the Session Initiation Protocol (SIP) Invite request from the first communications network is performed at an edge device of the second communications network located at a boundary between the first communications network and the second communications network.

Method Embodiment 1C. The communications method of method embodiment 1, wherein said determining at the second communications network whether or not the received SIP Invite request was previously diverted by said second communications network to another network is performed at an edge device of the second communications network located at a boundary between the first communications network and the second communications network.

Method Embodiment 1D. The communications method of claims 1, 1A, 1B, and 1C,
wherein the first communications network is a first Internet Protocol (IP) Multimedia Subsystem (IMS) network; wherein the second communications network is a second IP IMS network; wherein the another communications network is a IP IMS network; wherein said first communications network and said another communications network are operated by different service providers; and wherein said first communications network and said second communications network are operated by different service providers.

Method Embodiment 1E. The communications method of method embodiment 1D, wherein the edge device is an Interconnect Border Control Function (IBCF) device which provides IMS network security.

Method Embodiment 1F. The communications method of method embodiment 1E, wherein the edge device is a Session Border Controller configured to implement IBCF functionality.

Method Embodiment 1G. The communications method of method embodiment 1F, wherein the Session Border Controller is a virtual device implemented on a compute node in a cloud system.

Method Embodiment 2. The communications method of method embodiment 1, wherein said processing said SIP Invite request by the second communications network as a previously received and diverted SIP Invite request includes refraining from generating one or more duplicate Identity div headers for one or more previous diversions by said second communications network which occurred prior to said SIP Invite request being received from said first communications network.

Method Embodiment 2A. The communications method of method embodiment 1, wherein said processing said SIP Invite request by the second communications network as a previously received and diverted SIP Invite request includes: marking or deleting all History-Info headers included in the received SIP Invite request which include a domain name matching the domain name of the second communications network; determining, at an IMS core of the second communications network, that the SIP Invite request is to be diverted from a destination address in the second communications network to a diversion address located in third communications network, said destination address being the first SIP address; generating, at the IMS core of the second communications network, a History-Info header including the destination address; generating, at an Interconnect Border Control Function device, a second SIP Invite request, said second SIP Invite request including an Identity diversion header based information contained in the History-Info header including the destination address; transmitting from the Interconnect Border Control Function device the second SIP Invite request to the third communications network.

Method Embodiment 2B. The communications method of method embodiment 2A, wherein said generating, at the Interconnect Border Control Function device the second SIP Invite request further includes: identifying each History-Info header including a domain name that matches the domain name of the second communications network; generating an Identity diversion header for each identified History-Info header which has not been marked.

Method Embodiment 3. The communications method of method embodiment 1, wherein said determining at the second communications network whether or not the received SIP Invite request was previously diverted by said second communications network to another network includes: determining whether there is present in the SIP Invite request at least one SIP History-Info header including a domain name matching a domain name of the second communications network or at least one SIP Diversion header including a domain name matching the domain name of the second communication network; and wherein the communications method of method embodiment 1 further comprises: when said determination is that at least one SIP History-Info header including a domain name matching the domain name of the second communications network or at least one SIP Diversion header with a domain name that matches the domain name of the second communications network is present in said SIP Invite request, making a determination that the SIP Invite request was previously diverted by said second communications network to another network.

Method Embodiment 3A. The communications method of method embodiment 3, further comprising: when said determination is that there is not at least one SIP History-Info header including a domain name matching the domain name of the second communications network and that there is not at least one SIP Diversion header with a domain name that matches the domain name of the second communications network present in said SIP Invite request, making a determination that the SIP Invite request has not been previously diverted by said second communications network to another network.

Method Embodiment 4. The communications method of method embodiment 3, wherein said processing said SIP Invite request by the second communications network as a previously received and diverted SIP Invite request includes: identifying, by a first edge device of the second communications network, which of the one or more SIP Identity div headers included in the SIP Invite request includes a destination address with a domain name matching the domain name of the second communications network; and verifying, by the first edge device, the signature for each of the SIP Identity div headers included in the SIP Invite request identified as including a destination address with a domain name matching the domain name of the second communications network; and wherein said first edge device performed said receiving at the second communications network the Session Initiation Protocol (SIP) Invite request from the first communications network.

Method Embodiment 4A. The communications method of method embodiment 4, wherein each SIP Identity div header including in the SIP INVITE request includes an origin address, a destination address, and a diversion address, said origin address being an address from which the SIP Invite request originated, said destination address being an address to which the SIP Invite request was targeted, said diversion address being an address to which the SIP Invite request was diverted.

Method Embodiment 5. The communications method of method embodiment 4, wherein said processing said SIP Invite request by the second communications network as a previously received and diverted SIP Invite request further includes: generating a first updated SIP Invite request by the first edge device, said generating a first updated SIP Invite request including updating said SIP Invite request to mark or delete all SIP History-Info headers and SIP Diversion headers identified as corresponding to a successfully verified SIP Identity div header having a destination address with a domain name matching the domain name of the second communications network.

Method Embodiment 5A. The communications method of method embodiment 5, wherein said processing said SIP Invite request by the second communications network as a previously received and diverted SIP Invite request further includes: prior to generating a first updated SIP Invite request
identifying by the first edge device all SIP History-Info headers and SIP Diversion headers corresponding to the SIP Identity div headers which are present in the SIP Invite request and have been successfully verified which have a destination address with a domain name of the second communications network.

Method Embodiment 6. The communications method of method embodiment 5, further comprising: determining, by a first network device within the second communications network, that the first updated SIP Invite request directed to said first SIP address is to be diverted or forwarded to a second SIP address corresponding to a second user equipment device; generating, by the first network device, a SIP History-Info header including the first SIP address, said first SIP address including the domain name for said second communications network; generating, by the first network device, a second updated SIP request by updating the first updated SIP Invite request, said updating the first updated SIP Invite request including: (i) updating the SIP Invite request line to include the second SIP address, and (ii) adding said generated SIP History-Info header including the first SIP address.

Method Embodiment 6A. The communications method of method embodiment 1, wherein the first network device is located in the IMS core of the second communications network.

Method Embodiment 7. The communications method of method embodiment 3, wherein said processing said SIP Invite request by the second communications network as a previously received and diverted SIP Invite request includes: identifying, by a first edge device of the second communications network, which of the one or more SIP Invite request History-Info headers and Diversions headers include a domain name matching the domain name of the second communications network; marking or deleting each of the SIP Invite request History-Info headers and Diversion headers including a domain name matching the domain name of the second communications network; and wherein the first edge device performed said receiving at the second communications network the Session Initiation Protocol (SIP) Invite request from the first communications network.

Method Embodiment 8. The communications method of method embodiment 7, further comprising: determining, by a first network device within the second communications network, that the first updated SIP Invite request directed to said first SIP address is to be diverted or forwarded to a second SIP address corresponding to a second user equipment device; generating, by the first network device, a SIP History-Info header including the first SIP address, said first SIP address including the domain name for said second communications network; generating, by the first network device, a second updated SIP request by updating the first updated SIP Invite request, said updating the first updated SIP Invite request including: (i) updating the SIP Invite request line to include the second SIP address, and (ii) adding said generated SIP History-Info header including the first SIP address.

Method Embodiment 8A. The communications method of method embodiment 8, wherein the first network device is located in the IMS core of the second communications network.

Method Embodiment 9. The communications method of method embodiment 7 further comprising: determining, by a first network device within the second communications network, that the first updated SIP Invite request directed to said first SIP address is to be diverted or forwarded to a second SIP address corresponding to a second user equipment device, said second SIP address including a domain name matching the domain name of the second communications network; determining, by the first network device within the second communications network, that SIP Invite requests directed to the second SIP address are being diverted to a third SIP address, said third SIP address including a domain name of a third communications network; generating, by the first network device, a SIP History-Info header including the first SIP address, said first SIP address including the domain name for said second communications network; generating, by the first network device, a SIP History-Info header including the second SIP address, said second SIP address including the domain name for said second communications network; generating, by the first network device, a second updated SIP request by updating the first updated SIP Invite request, said updating the first updated SIP Invite request including: (i) updating the SIP Invite request line to include the third SIP address, (ii) adding said generated SIP History-Info header including the first SIP address, and (iii) adding said generated SIP History-Info header including the second SIP address.

Method Embodiment 10. The communications method of method embodiment 9 further comprising: generating, at a second edge device of the second communications network, a third updated SIP Invite request based on said second updated SIP Invite request, said generating said third updated SIP Invite request including: (i) refraining from generating SIP Identity diversion headers for marked History-Info headers and (ii) generating at least one SIP Identity diversion header for History-Info headers that include the domain name of the second communications network and are not marked; transmitting from the second edge device the third updated SIP Invite request to the third communication network.

Method Embodiment 10A. The communications method of method embodiment 10, wherein said generating at least one SIP Identity diversion header for History-Info headers that include the domain name of the second communications network and are not marked includes generating a single Identity diversion header for the SIP History-Info header including the first SIP address and the SIP History-Info header including the second SIP address.

Method Embodiment 10AA. The communications method of method embodiment 10A, wherein the single Identity diversion header for the SIP History-Info header including the first SIP address and the SIP History-Info header including the second SIP address includes a origin address, a destination address and diversion address, the destination address including the address of the first SIP address and the diversion address including the third SIP address.

Method Embodiment 10B. The communications method of method embodiment 10, wherein said generating at least one SIP Identity diversion header for History-Info headers that include the domain name of the second communications network and are not marked includes generating an Identity diversion header for the SIP History-Info header including the first SIP address and a separate Identity diversion header for the SIP History-Info header including the second SIP address.

Method Embodiment 10BB. The communications method of method embodiment 10B, wherein the Identity diversion header for the SIP History-Info header including the first SIP address includes an origin address, a destination address, and a diversion address, the destination address including the first SIP address, and the diversion address including the second SIP address; and wherein the separate Identity diversion header for the SIP History-Info header including the second SIP address includes an origin address, a destination address, and a diversion address, the destination address including the second SIP address, and the diversion address including the third SIP address.

Method Embodiment 10C. The communications method of method embodiment 10, wherein said second edge device of the second communications network is located at a boundary between the second communications network and the third communications network.

Method Embodiment 11. The communications method of method embodiment 10 further comprising: prior to generating at least one SIP Identity diversion header for History-Info headers that include the domain name of the second communications network and are not marked: identifying duplicative History-Info headers (e.g., History-Info headers with the same userpart but different hostpart); excluding the identified SIP History-Info headers from the SIP History-Info headers for which SIP Identity diversion headers are to be created; identifying SIP History-Info headers that do not have an address with a valid user information part; and excluding the identified SIP History-Info headers that do not have an address with a valid user information part from the SIP History-Info headers for which SIP Identity diversion headers are to be created.

LIST OF NUMBERED EXEMPLARY SYSTEM EMBODIMENTS

System Embodiment 1. A communications system comprising: a first edge device located in a first communications network, said first edge device including a first processor that controls the first edge device to perform the following operations: receive at the first edge device, a Session Initiation Protocol (SIP) Invite request from a second communications network, said SIP Invite request being directed to a first SIP address (e.g., sip:5617001002@operator2) corresponding to a first user equipment device located within the first communications network, said SIP Invite request including a SIP Identity shaken header and one or more SIP Identity div headers, said SIP Identity shaken header and said one or more SIP Identity div headers having been signed (i.e., encrypted in accordance with the STIR/SHAKEN suite of protocols); determine whether or not the received SIP Invite request was previously diverted by said first communications network (i.e., by a device within the first network) to another network; and when said SIP Invite request is determined to have been previously diverted by said first communications network to another network, processing by the first edge device, said SIP Invite request as a previously received and diverted SIP Invite request.

System Embodiment 1A. The communications system of system embodiment 1 further comprising: when said SIP Invite request is determined to not have been previously diverted by said first communications network to another network, processing the SIP Invite request by the first network device as a new SIP Invite request.

System Embodiment 1B. The communications system of system embodiment 1, wherein the first edge device is located at a boundary between the first communications network and the second communications network.

System Embodiment 1C. The communications system of system embodiment 1B, wherein the first edge device is an Interconnect Border Control Function (IBCF) device which provides IMS network security implemented as a virtual device implemented on a compute node in a cloud system.

System Embodiment 1D. The communications system of system embodiment 1, 1A or 1B, wherein the first communications network is a first Internet Protocol (IP) Multimedia Subsystem (IMS) network; wherein the second communications network is a second IP IMS network; wherein the another communications network is a IP IMS network; wherein said first communications network and said another communications network are operated by different service providers; and wherein said first communications network and said second communications network are operated by different service providers.

System Embodiment 1E. The communications system of system embodiment 1D, wherein the first edge device is an Interconnect Border Control Function (IBCF) device which provides IMS network security.

System Embodiment 1F. The communications system of system embodiment 1D, wherein the first edge device is a Session Border Controller configured to implement IBCF functionality.

System Embodiment 1G. The communications method of system embodiment 1E or 1F, wherein the Session Border Controller is a virtual device implemented on a compute node in a cloud system.

System Embodiment 2. The communications system of system embodiment 1 further comprising: a second edge device located in the first communications network, said second edge device including a processor that controls the second edge device to refrain from generating a SIP Identity div header for any SIP History-Info headers or SIP Diversion headers which have been marked by the first edge device.

System Embodiment 2A. The communications system of system embodiment 1 further comprising: a first network device located in an IMS core of the first communications network; and wherein said processing said SIP Invite request by the first edge device as a previously received and diverted SIP Invite request includes: updating the received SIP Invite request to generate a first updated SIP Invite request by marking or deleting all History-Info headers and/or all SIP Diversion headers included in the received SIP Invite request which include a domain name matching the domain name of the first communications network; transmitting said first updated SIP Invite request to the first network device.

System Embodiment 2B. The communications system of system embodiment 2A further comprising: a second edge device located in the first communications network; wherein the first network device includes a processor that controls the first network device to: receive the first updated SIP Invite request from the first edge device; determine that the first updated SIP Invite request is to be diverted from a destination address in the first communications network to a diversion address located in a third communications network, said destination address being the first SIP address; generate a History-Info header and/or Diversion header including the destination address; generate a second updated SIP Invite request based on said first updated SIP Invite request which includes the generated History-Info header and/or Diversion header including the destination address; and transmit the second updated SIP Invite request to the second edge device of the first communications network, said second edge device being located at a boundary between the first communications network and the third communications network.

System Embodiment 2C. The communications system of system embodiment 2B, wherein said second edge device includes a processor that controls the second edge device to: receive the second updated SIP Invite Request from the first network device; generate a third updated SIP Invite request based on said second updated SIP Invite request; said third updated SIP Invite request including an Identity diversion header based on information contained in the History-Info header or the Diversion header including the destination address; and transmit from the second device the third updated SIP Invite request to the third communications network.

System Embodiment 2C1. The communications system of system embodiment 2C, wherein said generating the third updated SIP Invite request based on said second updated SIP Invite request includes removing the markings of the SIP History-Info headers and SIP Diversion headers introduced by the first edge device.

System Embodiment 2D. The communications system of system embodiment 2C, wherein said generating said third updated SIP Invite request further includes: identifying from the second updated SIP Invite request each History-Info header including a domain name that matches the domain name of the first communications network; generating an Identity diversion header for each identified History-Info header which meets a first criteria.

System Embodiment 2E. The communications system of system embodiment 2D, wherein said first criteria is that the identified History-Info header is not marked (i.e., does not include a marking from the first edge device).

System Embodiment 2F. The communications system of system embodiment 2E, wherein said first criteria further includes that the identified History-Info header has a valid user information part.

System Embodiment 2G. The communications system of system embodiment 2F, wherein said first criteria further includes that the identified History-Info header is not duplicative of another History-Info header for which a SIP Identity diversion header has been generated (e.g., the History-Info header has the same userpart but different hostpart than another History-Info header for which a SIP Identity diversion header has been generated).

System Embodiment 2H. The communications system of system embodiment 2C, wherein said generating said third updated SIP Invite request further includes: identifying from the second updated SIP Invite request each Diversion header including a domain name that matches the domain name of the first communications network; generating an Identity diversion header for each identified Diversion header which meets a first criteria.

System Embodiment 2I. The communications system of system embodiment 2H, wherein said first criteria is that the identified Diversion header is not marked (i.e., does not include a marking from the first edge device).

System Embodiment 2J. The communications system of system embodiment 2I, wherein said first criteria further includes that the identified Diversion header has a valid user information part.

System Embodiment 2K. The communications system of system embodiment 2J, wherein said first criteria further includes that the identified Diversion header is not duplicative of another Diversion header for which a SIP Identity diversion header has been generated (e.g., the Diversion header has the same userpart but different hostpart than another Diversion header for which a SIP Identity diversion header has been generated).

System Embodiment 3. The communications method of system embodiment 1, wherein said determining at the first edge device whether or not the received SIP Invite request was previously diverted by said first communications network to another network includes: determining whether there is present in the SIP Invite request at least one SIP History-Info header including a domain name matching a domain name of the first communications network or at least one SIP Diversion header including a domain name matching the domain name of the first communication network; and wherein the first processor further controls the first edge device to perform the following operation: when said determination is that at least one SIP History-Info header including a domain name matching the domain name of the first communications network or at least one SIP Diversion header with a domain name that matches the domain name of the first communications network is present in said SIP Invite request, making a determination that the SIP Invite request was previously diverted by said first communications network to another network.

System Embodiment 3A. The communications system of system embodiment 3, wherein the first processor further controls the first edge device to perform the following operation: when said determination is that there is not at least one SIP History-Info header including a domain name matching the domain name of the first communications network and that there is not at least one SIP Diversion header with a domain name that matches the domain name of the first communications network present in said SIP Invite request, making a determination that the SIP Invite request has not been previously diverted by said first communications network to another network.

System Embodiment 4. The communications system of system embodiment 3, wherein said operation of processing said SIP Invite request by the first network device as a previously received and diverted SIP Invite request includes: identifying, by the first edge device of the first communications network, which of the one or more SIP Identity div headers included in the SIP Invite request includes a destination address with a domain name matching the domain name of the first communications network; and verifying, by the first edge device, the signature for each of the SIP Identity div headers included in the SIP Invite request identified as including a destination address with a domain name matching the domain name of the first communications network.

System Embodiment 4A. The communications system of system embodiment 4, wherein each SIP Identity div header including in the SIP INVITE request includes an origin address, a destination address, and a diversion address, said origin address being an address from which the SIP Invite request originated, said destination address being an address to which the SIP Invite request was targeted, said diversion address being an address to which the SIP Invite request was diverted.

System Embodiment 5. The communications system of system embodiment 4, wherein said operation of processing said SIP Invite request by the first edge device as a previously received and diverted SIP Invite request further includes: generating a first updated SIP Invite request by the first edge device, said generating a first updated SIP Invite request including updating said SIP Invite request to mark or delete all SIP History-Info headers and SIP Diversion headers identified as corresponding to a successfully verified SIP Identity div header having a destination address with a domain name matching the domain name of the first communications network.

System Embodiment 5A The communications system of system embodiment 5, wherein said operation of processing said SIP Invite request by the first edge device as a previously received and diverted SIP Invite request further includes: prior to generating a first updated SIP Invite request identifying by the first edge device all SIP History-Info headers and SIP Diversion headers corresponding to the SIP Identity div headers which are present in the SIP Invite request and have been successfully verified which have a destination address with a domain name of the first communications network.

System Embodiment 6. The communications system of system embodiment 5, further comprising: a first network device including a second processor located in the first communications network, said second processor controlling the first network device to perform the following operations: determine that the first updated SIP Invite request directed to said first SIP address is to be diverted or forwarded to a second SIP address corresponding to a second user equipment device; generate a SIP History-Info header including the first SIP address, said first SIP address including the domain name for said first communications network; generate, by the first network device, a second updated SIP Invite request by updating the first updated SIP Invite request, said updating the first updated SIP Invite request including: (i)

updating the SIP Invite request line to include the second SIP address, and (ii) adding said generated SIP History-Info header including the first SIP address.

System Embodiment 6A. The communications system of system embodiment 1, wherein the first network device is located in the IMS core of the second communications network.

System Embodiment 7. The communications system of system embodiment 3, wherein said operation of processing said SIP Invite request by the first edge device as a previously received and diverted SIP Invite request includes: identifying, by the first edge device of the first communications network, which of the one or more SIP Invite request History-Info headers and Diversions headers include a domain name matching the domain name of the second communications network; and marking or deleting each of the SIP Invite request History-Info headers and Diversion headers including a domain name matching the domain name of the second communications network.

System Embodiment 8. The communications system of system embodiment 7, wherein said second processor further controls the first network device to perform the following operations: determine that the first updated SIP Invite request directed to said first SIP address is to be diverted or forwarded to a second SIP address corresponding to a second user equipment device; generate a SIP History-Info header including the first SIP address, said first SIP address including the domain name for said first communications network; generate a second updated SIP request by updating the first updated SIP Invite request, said updating the first updated SIP Invite request including: (i) updating the SIP Invite request line to include the second SIP address, and (ii) adding said generated SIP History-Info header including the first SIP address.

System Embodiment 8A. The communications system of system embodiment 8, wherein the first network device is located in the IMS core of the first communications network.

System Embodiment 9. The communications system of system embodiment 7, wherein said second processor further controls the first network device to perform the following operations: determine that the first updated SIP Invite request directed to said first SIP address is to be diverted or forwarded to a second SIP address corresponding to a second user equipment device, said second SIP address including a domain name matching the domain name of the first communications network; determine that SIP Invite requests directed to the second SIP address are being diverted to a third SIP address, said third SIP address including a domain name of a third communications network; generate a SIP History-Info header including the first SIP address, said first SIP address including the domain name for said first communications network; generate a SIP History-Info header including the second SIP address, said second SIP address including the domain name for said first communications network; generate a second updated SIP request by updating the first updated SIP Invite request, said updating the first updated SIP Invite request including: (i) updating the SIP Invite request line to include the third SIP address, (ii) adding said generated SIP History-Info header including the first SIP address, and (iii) adding said generated SIP History-Info header including the second SIP address.

System Embodiment 10. The communications system of system embodiment 9 further comprising: a second edge device located in the first communications network, said second edge device including a third processor that controls the second edge device to perform the following operations: generate a third updated SIP Invite request based on said second updated SIP Invite request, said generate said third updated SIP Invite request including: (i) refraining from generating SIP Identity diversion headers for marked History-Info headers and (ii) generating at least one SIP Identity diversion header for History-Info headers that include the domain name of the first communications network and are not marked; transmit from the second edge device the third updated SIP Invite request to the third communication network.

System Embodiment 10A. The communications system of system embodiment 10, wherein said operation of generating at least one SIP Identity diversion header for History-Info headers that include the domain name of the first communications network and are not marked includes generating a single Identity diversion header for the SIP History-Info header including the first SIP address and the SIP History-Info header including the second SIP address.

System Embodiment 10AA. The communications system of system embodiment 10A, wherein the single Identity diversion header for the SIP History-Info header including the first SIP address and the SIP History-Info header including the second SIP address includes a origin address, a destination address and diversion address, the destination address including the address of the first SIP address and the diversion address including the third SIP address.

System Embodiment 10B. The communications system of system embodiment 10, wherein said operation of generating at least one SIP Identity diversion header for History-Info headers that include the domain name of the second communications network and are not marked includes generating an Identity diversion header for the SIP History-Info header including the first SIP address and a separate Identity diversion header for the SIP History-Info header including the second SIP address.

System Embodiment 10BB. The communications system of system embodiment 10B, wherein the Identity diversion header for the SIP History-Info header including the first SIP address includes an origin address, a destination address, and a diversion address, the destination address including the first SIP address, and the diversion address including the second SIP address; and wherein the separate Identity diversion header for the SIP History-Info header including the second SIP address includes an origin address, a destination address, and a diversion address, the destination address including the second SIP address, and the diversion address including the third SIP address.

System Embodiment 10C. The communications system of system embodiment 10, wherein said second edge device of the first communications network is located at a boundary between the first communications network and the third communications network.

System Embodiment 10D. The communications system of system embodiment 10C, wherein the first communications network is a first Internet Protocol (IP) Multimedia Subsystem (IMS) network; wherein the second communications network is a second IP IMS network; wherein the another communications network is a IP IMS network; wherein said first communications network and said another communications network are operated by different service providers; and wherein said first communications network and said second communications network are operated by different service providers; wherein the first edge device is an Interconnect Border Control Function (IBCF) device which provides IMS network security or a Session Border Controller configured to implement IBCF functionality; wherein the second edge device is an Interconnect Border Control Function (IBCF) device which provides IMS network security or a Session Border Controller configured to implement IBCF functionality.

System Embodiment 10E. The communications system of system embodiment 10D, wherein one or more of the following are virtual devices implemented on a compute node in a cloud system: the first edge device, the second edge device, the first network equipment device.

System Embodiment 11. The communications system of system embodiment 10 wherein said third processor further controls the second edge device to perform, prior to generating at least one SIP Identity diversion header for History-Info headers that include the domain name of the second communications network and are not marked, the operation of: identifying duplicative History-Info headers (e.g., History-Info headers with the same userpart but different hostpart) and excluding the identified SIP History-Info headers from the SIP History-Info headers for which SIP Identity diversion headers are to be created; identifying SIP History-Info headers that do not have an address with a valid user information part and excluding the identified SIP History-Info headers that do not have an address with a valid user information part from the SIP History-Info headers for which SIP Identity diversion headers are to be created.

LIST OF NUMBERED EXEMPLARY NON-TRANSITORY MACHINE READABLE MEDIUM EMBODIMENTS

Non-transitory Machine Readable Medium Embodiment 1. A non-transitory machine readable medium including processor executable instructions, which when executed by a processor of a first edge device located in a first communications network to control the first edge device to: receive a Session Initiation Protocol (SIP) Invite request from a second communications network, said SIP Invite request being directed to a first SIP address (e.g., sip: 5617001002@operator2) corresponding to a first user equipment device located within the first communications network, said SIP Invite request including a SIP Identity shaken header and one or more SIP Identity div headers, said SIP Identity shaken header and said one or more SIP Identity div headers having been signed (i.e., encrypted in accordance with the STIR/SHAKEN suite of protocols); determine whether or not the received SIP Invite request was previously diverted by said first communications network (i.e., by a device within the first network) to another network; and when said SIP Invite request is determined to have been previously diverted by said first communications network to another network, processing by the first edge device, said SIP Invite request as a previously received and diverted SIP Invite request.

Non-transitory Machine Readable Medium Embodiment 1A. The non-transitory machine readable medium of non-transitory machine readable medium embodiment 1 further comprising: when said SIP Invite request is determined to not have been previously diverted by said first communications network to another network, processing the SIP Invite request by the first network device as a new SIP Invite request.

Non-transitory Machine Readable Medium Embodiment 1B. The non-transitory machine readable medium of non-transitory machine readable medium embodiment 1, wherein the first edge device is located at a boundary between the first communications network and the second communications network.

Non-transitory Machine Readable Medium Embodiment 1C. The non-transitory machine readable medium of non-transitory machine readable medium embodiment 1B, wherein the first edge device is an Interconnect Border Control Function (IBCF) device which provides IMS network security implemented as a virtual device implemented on a compute node in a cloud system.

Non-transitory Machine Readable Medium Embodiment 1D. The non-transitory machine readable medium of non-transitory machine readable medium embodiment 1, 1A or 1B, wherein the first communications network is a first Internet Protocol (IP) Multimedia Subsystem (IMS) network; wherein the second communications network is a second IP IMS network; wherein the another communications network is a IP IMS network; wherein said first communications network and said another communications network are operated by different service providers; and wherein said first communications network and said second communications network are operated by different service providers.

Non-transitory Machine Readable Medium Embodiment 1E. The non-transitory machine readable medium of non-transitory machine readable medium embodiment 1D, wherein the first edge device is an Interconnect Border Control Function (IBCF) device which provides IMS network security.

Non-transitory Machine Readable Medium Embodiment 1F. The non-transitory machine readable embodiment of non-transitory machine readable medium embodiment 1D, wherein the first edge device is a Session Border Controller configured to implement IBCF functionality.

Non-transitory Machine Readable Medium Embodiment 1G. The non-transitory machine readable medium of non-transitory machine readable medium embodiment 1E or 1F, wherein the Session Border Controller is a virtual device implemented on a compute node in a cloud system.

The techniques of various embodiments may be implemented using software, hardware and/or a combination of software and hardware. Various embodiments are directed to apparatus, e.g., sensors, call processing devices, gateways, session border controllers, network nodes and/or network equipment devices. Various embodiments are also directed to methods, e.g., method of controlling and/or operating devices such as sensors, call processing devices, gateways, session border controllers, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or, in some embodiments, logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., sensors, call processing devices, gateways, session border controllers, network nodes and/or network equipment devices, including a processor configured to implement one, multiple or all of the steps of one or more methods of the invention.

In some embodiments, the processor or processors, e.g., CPUs, of one or more devices, e.g., computing nodes such as call processing devices, session border controllers are configured to perform the steps of the methods described as being performed by the computing nodes, e.g., sensors, call processing devices, gateways, session border controllers, network nodes and/or network equipment devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as sensors, call processing devices, gateways, session border controllers, network nodes and/or network equipment devices with a processor which includes a component corresponding to each of the steps of the various described methods performed by the device in which the processor is included. In some but not all embodiments a device, e.g., computing node such as session border controllers, gateways, message and/or packet processing devices, call processing devices, network nodes and/or network equipment devices, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope of the invention. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
 receiving at a second communications network a Session Initiation Protocol (SIP) Invite request from a first communications network, said SIP Invite request being directed to a first SIP address corresponding to a first user equipment device located within the second communications network, said SIP Invite request including a SIP Identity shaken header and one or more SIP Identity div headers, said SIP Identity shaken header and said one or more SIP Identity div headers having been signed;
 determining at the second communications network whether or not the received SIP Invite request was previously diverted by said second communications network to another network; and
 when said SIP Invite request is determined to have been previously diverted by said second communications network to another network, processing said SIP Invite request at the second communications network as a previously received and diverted SIP Invite request.

2. The communications method of claim 1,
 wherein said processing said SIP Invite request by the second communications network as a previously received and diverted SIP Invite request includes refraining from generating one or more duplicate Identity div headers for one or more previous diversions by said second communications network which occurred prior to said SIP Invite request being received from said first communications network.

3. The communications method of claim 1,
 wherein said determining at the second communications network whether or not the received SIP Invite request was previously diverted by said second communications network to another network includes: determining whether there is present in the SIP Invite request at least one SIP History-Info header including a domain name matching a domain name of the second communications network or at least one SIP Diversion header including a domain name matching the domain name of the second communication network; and
 wherein the communications method of claim 1 further comprises:
 when said determination is that at least one SIP History-Info header including a domain name matching the domain name of the second communications network or at least one SIP Diversion header with a domain name that matches the domain name of the second communications network is present in said SIP Invite request, making a determination that the SIP Invite request was previously diverted by said second communications network to another network.

4. The communications method of claim 3,
wherein said processing said SIP Invite request by the second communications network as a previously received and diverted SIP Invite request includes:
identifying, by a first edge device of the second communications network, which of the one or more SIP Identity div headers included in the SIP Invite request includes a destination address with a domain name matching the domain name of the second communications network; and
verifying, by the first edge device, the signature for each of the SIP Identity div headers included in the SIP Invite request identified as including a destination address with a domain name matching the domain name of the second communications network; and
wherein said first edge device performed said receiving at the second communications network the Session Initiation Protocol (SIP) Invite request from the first communications network.

5. The communications method of claim 4,
wherein said processing said SIP Invite request by the second communications network as a previously received and diverted SIP Invite request further includes:
generating a first updated SIP Invite request by the first edge device, said generating a first updated SIP Invite request including updating said SIP Invite request to mark or delete all SIP History-Info headers and SIP Diversion headers identified as corresponding to a successfully verified SIP Identity div header having a destination address with a domain name matching the domain name of the second communications network.

6. The communications method of claim 5, further comprising:
determining, by a first network device within the second communications network, that the first updated SIP Invite request directed to said first SIP address is to be diverted or forwarded to a second SIP address corresponding to a second user equipment device;
generating, by the first network device, a SIP History-Info header including the first SIP address, said first SIP address including the domain name for said second communications network; and
generating, by the first network device, a second updated SIP Invite request by updating the first updated SIP Invite request, said updating the first updated SIP Invite request including: (i) updating a SIP Invite request line of the first updated SIP Invite request to include the second SIP address, and (ii) adding said generated SIP History-Info header including the first SIP address.

7. The communications method of claim 3,
wherein said processing said SIP Invite request by the second communications network as a previously received and diverted SIP Invite request includes:
identifying, by a first edge device of the second communications network, which of the one or more SIP Invite request History-Info headers and Diversion headers include a domain name matching the domain name of the second communications network;
marking or deleting each of the SIP Invite request History-Info headers and Diversion headers including a domain name matching the domain name of the second communications network, said SIP Invite request after said marking or deleting operation being a first updated SIP Invite request; and
wherein the first edge device performed said receiving at the second communications network the Session Initiation Protocol (SIP) Invite request from the first communications network.

8. The communications method of claim 7, further comprising:
determining, by a first network device within the second communications network, that the first updated SIP Invite request directed to said first SIP address is to be diverted or forwarded to a second SIP address corresponding to a second user equipment device;
generating, by the first network device, a SIP History-Info header including the first SIP address, said first SIP address including the domain name for said second communications network; and
generating, by the first network device, a second updated SIP Invite request by updating the first updated SIP Invite request, said updating the first updated SIP Invite request including: (i) updating a SIP Invite request line of the first updated SIP Invite request to include the second SIP address, and (ii) adding said generated SIP History-Info header including the first SIP address.

9. The communications method of claim 7, further comprising:
determining, by a first network device within the second communications network, that the first updated SIP Invite request directed to said first SIP address is to be diverted or forwarded to a second SIP address corresponding to a second user equipment device, said second SIP address including a domain name matching the domain name of the second communications network;
determining, by the first network device within the second communications network, that SIP Invite requests directed to the second SIP address are being diverted to a third SIP address, said third SIP address including a domain name of a third communications network;
generating, by the first network device, a SIP History-Info header including the first SIP address, said first SIP address including the domain name for said second communications network;
generating, by the first network device, a SIP History-Info header including the second SIP address, said second SIP address including the domain name for said second communications network; and
generating, by the first network device, a second updated SIP Invite request by updating the first updated SIP Invite request, said updating the first updated SIP Invite request including: (i) updating a SIP Invite request line of the first updated SIP Invite request to include the third SIP address, (ii) adding said generated SIP History-Info header including the first SIP address, and (iii) adding said generated SIP History-Info header including the second SIP address.

10. The communications method of claim 9, further comprising:
generating, at a second edge device of the second communications network, a third updated SIP Invite request based on said second updated SIP Invite request, said generating said third updated SIP Invite request including: (i) refraining from generating SIP Identity diversion headers for marked History-Info headers and (ii) generating at least one SIP Identity diversion header for History-Info headers that include the domain name of the second communications network and are not marked; and transmitting from the second edge device the third updated SIP Invite request to the third communication network.

11. A communications system comprising:

a first edge device located in a first communications network, said first edge device including a first processor that controls the first edge device to perform the following operations:

receive at the first edge device, a Session Initiation Protocol (SIP) Invite request from a second communications network, said SIP Invite request being directed to a first SIP address corresponding to a first user equipment device located within the first communications network, said SIP Invite request including a SIP Identity shaken header and one or more SIP Identity div headers, said SIP Identity shaken header and said one or more SIP Identity div headers having been signed;

determine whether or not the received SIP Invite request was previously diverted by said first communications network to another network; and when said SIP Invite request is determined to have been previously diverted by said first communications network to another network, processing by the first edge device, said SIP Invite request as a previously received and diverted SIP Invite request.

12. The communications system of claim 11 further comprising:

a second edge device located in the first communications network, said second edge device including a processor that controls the second edge device to refrain from generating a SIP Identity div header for any SIP History-Info headers or SIP Diversion headers which have been marked by the first edge device.

13. The communications system of claim 11, wherein said determining at the first edge device whether or not the received SIP Invite request was previously diverted by said first communications network to another network includes: determining whether there is present in the SIP Invite request at least one SIP History-Info header including a domain name matching a domain name of the first communications network or at least one SIP Diversion header including a domain name matching the domain name of the first communication network; and wherein the first processor further controls the first edge device to perform the following operation:

when said determination is that at least one SIP History-Info header including a domain name matching the domain name of the first communications network or at least one SIP Diversion header with a domain name that matches the domain name of the first communications network is present in said SIP Invite request, making a determination that the SIP Invite request was previously diverted by said first communications network to another network.

14. The communications system of claim 13, wherein said operation of processing said SIP Invite request by the first edge device as a previously received and diverted SIP Invite request includes:

identifying, by the first edge device of the first communications network, which of the one or more SIP Identity div headers included in the SIP Invite request includes a destination address with a domain name matching the domain name of the first communications network; and verifying, by the first edge device, the signature for each of the SIP Identity div headers included in the SIP Invite request identified as including a destination address with a domain name matching the domain name of the first communications network.

15. The communications system of claim 14, wherein said operation of processing said SIP Invite request by the first edge device as a previously received and diverted SIP Invite request further includes:

generating a first updated SIP Invite request by the first edge device, said generating a first updated SIP Invite request including updating said SIP Invite request to mark or delete all SIP History-Info headers and SIP Diversion headers identified as corresponding to a successfully verified SIP Identity div header having a destination address with a domain name matching the domain name of the first communications network.

16. The communications system of claim 15, further comprising:

a first network device including a second processor located in the first communications network, said second processor controlling the first network device to perform the following operations:

determine that the first updated SIP Invite request directed to said first SIP address is to be diverted or forwarded to a second SIP address corresponding to a second user equipment device;

generate a SIP History-Info header including the first SIP address, said first SIP address including the domain name for said first communications network;

generate, by the first network device, a second updated SIP Invite request by updating the first updated SIP Invite request, said updating the first updated SIP Invite request including: (i) updating a SIP Invite request line of the first updated SIP Invite request to include the second SIP address, and (ii) adding said generated SIP History-Info header including the first SIP address.

17. The communications system of claim 13, wherein said operation of processing said SIP Invite request by the first edge device as a previously received and diverted SIP Invite request includes:

identifying, by the first edge device of the first communications network, which of the one or more SIP Invite request History-Info headers and Diversion headers include a domain name matching the domain name of the second communications network; and marking or deleting each of the SIP Invite request History-Info headers and Diversion headers including a domain name matching the domain name of the second communications network, said SIP Invite request after said marking or deleting operation being a first updated SIP Invite request.

18. The communications system of claim 17, wherein a second processor controls a first network device to perform the following operations:

determine that the first updated SIP Invite request directed to said first SIP address is to be diverted or forwarded to a second SIP address corresponding to a second user equipment device;

generate a SIP History-Info header including the first SIP address, said first SIP address including the domain name for said first communications network;

generate a second updated SIP Invite request by updating the first updated SIP Invite request, said updating the first updated SIP Invite request including: (i) updating a SIP Invite request line of the first updated SIP Invite request to include the second SIP address, and (ii) adding said generated SIP History-Info header including the first SIP address.

19. The communications system of claim 17, wherein said second processor further controls the first network device to perform the following operations:
- determine that the first updated SIP Invite request directed to said first SIP address is to be diverted or forwarded to a second SIP address corresponding to a second user equipment device, said second SIP address including a domain name matching the domain name of the first communications network;
- determine that SIP Invite requests directed to the second SIP address are being diverted to a third SIP address, said third SIP address including a domain name of a third communications network;
- generate a SIP History-Info header including the first SIP address, said first SIP address including the domain name for said first communications network;
- generate a SIP History-Info header including the second SIP address, said second SIP address including the domain name for said first communications network; and
- generate a second updated SIP Invite request by updating the first updated SIP Invite request, said updating the first updated SIP Invite request including: (i) updating a SIP Invite request line of the first updated SIP Invite request to include the third SIP address, (ii) adding said generated SIP History-Info header including the first SIP address, and (iii) adding said generated SIP History-Info header including the second SIP address.

20. A non-transitory machine readable medium including processor executable instructions, which when executed by a processor of a first edge device located in a first communications network control the first edge device to:
- receive a Session Initiation Protocol (SIP) Invite request from a second communications network, said SIP Invite request being directed to a first SIP address corresponding to a first user equipment device located within the first communications network, said SIP Invite request including a SIP Identity shaken header and one or more SIP Identity div headers, said SIP Identity shaken header and said one or more SIP Identity div headers having been signed;
- determine whether or not the received SIP Invite request was previously diverted by said first communications network to another network; and
- when said SIP Invite request is determined to have been previously diverted by said first communications network to another network, processing by the first edge device, said SIP Invite request as a previously received and diverted SIP Invite request.

* * * * *